United States Patent
Zhang et al.

(10) Patent No.: US 12,261,821 B2
(45) Date of Patent: Mar. 25, 2025

(54) REUSE OF IP ADDRESSES

(71) Applicant: Telefonaktiebolaget LM Ericsson (publ), Stockholm (SE)

(72) Inventors: Wen Zhang, Shanghai (CN); Yingjiao He, Shanghai (CN); Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/924,155

(22) PCT Filed: Sep. 29, 2020

(86) PCT No.: PCT/EP2020/077212
§ 371 (c)(1),
(2) Date: Nov. 9, 2022

(87) PCT Pub. No.: WO2021/228419
PCT Pub. Date: Nov. 18, 2021

(65) Prior Publication Data
US 2023/0224272 A1    Jul. 13, 2023

(30) Foreign Application Priority Data

May 13, 2020 (WO) ............... PCT/CN2020/090036

(51) Int. Cl.
*H04L 61/503* (2022.01)
*H04L 9/40* (2022.01)
(Continued)

(52) U.S. Cl.
CPC ........ *H04L 61/503* (2022.05); *H04L 61/5061* (2022.05); *H04L 63/02* (2013.01); *H04W 8/26* (2013.01); *H04L 2101/686* (2022.05)

(58) Field of Classification Search
CPC ............... H04L 61/503; H04L 61/2514; H04L 61/2517; H04L 69/329; H04L 69/32;
(Continued)

(56) References Cited

U.S. PATENT DOCUMENTS 7,836,182 B1 * 11/2010 Scano ................... H04L 69/329
709/245
2006/0274899 A1 * 12/2006 Zhu .......................... H04L 63/02
380/281
(Continued)

FOREIGN PATENT DOCUMENTS

JP    2020527315 A    9/2020
JP    2023175857 A    12/2023
(Continued)

OTHER PUBLICATIONS

Author Unknown, "Technical Specification Group Core Network and Terminals; Numbering, addressing and dentification; (Release 16)," Technical Specification 23.003, Version 16.2.0, Mar. 2020, 3GPP Organizational Partners, 140 pages.
(Continued)

*Primary Examiner* — Kyung H Shin
(74) *Attorney, Agent, or Firm* — Withrow & Terranova, PLLC

(57) ABSTRACT

The present disclosure proposes network elements, methods at the network elements for facilitating reuse of IP address, a telecommunications system comprising the network elements. The method at a first network element for facilitating reuse of an IP address at multiple UEs comprising a first UE comprises: transmitting, to a second network element, a first request message associated with the first UE, the first request message comprising the IP address and a first indicator which, in conjunction with the IP address, uniquely identifies the first UE.

18 Claims, 6 Drawing Sheets

(51) Int. Cl.
*H04L 61/5061* (2022.01)
*H04W 8/26* (2009.01)
*H04L 101/686* (2022.01)

(58) Field of Classification Search
CPC ............... H04L 61/5007; H04L 69/324; H04L 61/5061; H04L 41/0843; H04L 63/02; H04L 9/083; H04L 63/062; H04L 63/029; H04L 63/0823
See application file for complete search history.

(56) References Cited

U.S. PATENT DOCUMENTS

| | | | |
|---|---|---|---|
| 2008/0005344 A1* | 1/2008 | Ford | ............... H04L 61/5061 709/230 |
| 2014/0092899 A1* | 4/2014 | Krishna | ............... H04L 61/503 370/389 |
| 2020/0059761 A1 | 2/2020 | Li et al. | |
| 2020/0120446 A1 | 4/2020 | Stammers et al. | |

FOREIGN PATENT DOCUMENTS

| | | |
|---|---|---|
| WO | 2019017836 A1 | 1/2019 |
| WO | 2020036882 A1 | 2/2020 |

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

Author Unknown, "Technical Specification Group Core Network and Terminals; Interworking between the Public Land Mobile Network (PMLN) supporting packet based services and Packet Data Networks (PDN) (Release 15)," Technical Specification 29.061, Version 15.5.0, Dec. 2018, 3GPP Organizational Partners, 175 pages.

Author Unknown, "Technical Specification Group Core Network and Terminals; Cx and Dx interfaces based on the Diameter protocol; Protocol details (Release 16)," Technical Specification 29.229, Version 16.1.0, Dec. 2019, 3GPP Organizational Partners, 41 pages.

Author Unknown, "Technical Specification Group Core Network and Terminals; 5G System; Session Management Policy Control Service; Stage 3 (Release 16)," Technical Specification 29.512, Version 16.4.0, Mar. 2020, 3GPP Organizational Partners, 186 pages.

Author Unknown, "Technical Specification Group Core Network and Terminals; 5G System; Interworking between 5G Network and external Data Networks; Stage 3 (Release 16)," Technical Specification 29.561, Version 16.3.0, Mar. 2020, 3GPP Organizational Partners, 65 pages.

Author Unknown, "Technical Specification Group Core Network and Terminals; 5G System; Interworking between 5G Network and external Data Networks; Stage 3 (Release 16)," Technical Specification 29.561, Version 16.5.0, Sep. 2020, 3GPP Organizational Partners, 65 pages.

Author Unknown, "Technical Specification Group Core Network and Terminals; 5G System; Common Data Types for Service Based Interfaces; Stage 3 (Release 16)," Technical Specification 29.571, Version 16.3.0, Mar. 2020, 3GPP Organizational Partners, 100 pages.

Eronen, et al., "Diameter Extensible Authentication Protocol (EAP) Application," Request for Comments 4072, Aug. 2005, the Internet Society, 33 pages.

International Preliminary Report on Patentability for International Patent Application No. PCT/EP2020/077212, mailed Aug. 31, 2022, 22 pages.

Zorn, "Diameter Network Access Server Application," Request for Comments 7155, Apr. 2014, Internet Engineering Task Force, 70 pages.

Ericsson, "C3-202309: Add NR-U RAT type," 3GPP TSG-CT WG3 Meeting #109e, Apr. 16-24, 2020, E-Meeting, 8 pages.

Ericsson, "C3-203227: IP address pool id in accounting and its IP version," 3GPP TSG-CT WG3 Meeting #110e, Jun. 2-11, 2020, 14 pages.

Ericsson, "C3-204193: Add missing applicable messages for IP pool info," 3GPP TSG-CT WG3 Meeting #111e, Aug. 19-28, 2020, E-Meeting, 8 pages.

T-Mobile USA Inc, "S2-170947: IP Index for IP Address Allocation based on PCF," 3GPP SA WG2 Meeting #119, Feb. 13-17, 2017, Dubrovnik, Croatia, 4 pages.

International Search Report and Written Opinion for International Patent Application No. PCT/EP2020/077212, mailed Jan. 28, 2021, 18 pages.

Ericsson, "C3-202308: Add NR-U RAT type," 3GPP TSG-CT WG3 Meeting #109e, Apr. 16-24, 2020, Electronic Meeting, 18 pages.

First Office Action for Chinese Patent Application No. 202080100337.3, mailed Nov. 10, 2023, 6 pages.

Examination Report for European Patent Application No. 20781519.2, mailed Oct. 17, 2023, 4 pages.

Office Action for Japanese Patent Application No. 2022-568400, mailed Mar. 26, 2024, 6 pages.

* cited by examiner

700

REUSE OF IP ADDRESSES

This application is a 35 U.S.C. § 371 national phase filing of International Application No. PCT/EP2020/077212, filed Sep. 29, 2020, which claims the benefit of International Application No. PCT/CN2020/090036, filed May 13, 2020, the disclosures of which are incorporated herein by reference in their entireties.

TECHNICAL FIELD

The present disclosure is related to the field of telecommunication, and in particular, to network elements (NEs), methods at NEs for facilitating reuse of an Internet Protocol (IP) address, and a telecommunications system comprising the NEs.

BACKGROUND

In modern telecommunications networks, almost each and every device or node of the networks will be assigned with at least one IP address, and therefore IP addresses are definitely one of the most important resources for network operators.

An IP address is a numerical label assigned to each device connected to a network that uses the Internet Protocol for communication. An IP address serves two main functions: host or network interface identification and location addressing. Internet Protocol version 4 (IPv4) defines an IP address as a 32-bit number, such as 202.106.196.115 in decimal or "11001010 01101010 11000100 01110011" in binary. However, because of the fast growth of the Internet and the depletion of available IPv4 addresses, a new version of IP (IPv6), using 128 bits for the IP address, is presented, such as 2400:3200::1 in hex or 2400:3200:0000:0000:0000:0000: 0000:0001 in its full address format.

The IP address space is managed globally by the Internet Assigned Numbers Authority (IANA), and by five regional Internet registries (RIRs) responsible in their designated territories for assignment to local Internet registries, such as Internet service providers, and other end users. IPv4 addresses were distributed by IANA to the RIRs in blocks of approximately 16.8 million addresses each. Further, some IPv4 addresses are reserved for private networks and are not globally unique.

Although IPv6 supports much more IP addresses than its predecessor IPv4, the existence of legacy devices, which support IPv4 only, requires a modern telecommunications network to support IPv4 for communication with the legacy devices, and therefore IPv4 is still widely used and more IPv4 addresses are still in need. For example, one of the largest telecommunication operators in China may have hundreds of millions of subscribers, whereas less than a million of public IPv4 addresses may be allocated by the Asia-Pacific Network Information Centre (APNIC) to the operator. In such a case, even with the Network Address Translation (NAT) technology, the operator still cannot provide enough IPv4 addresses (even private IPv4 addresses) to its subscribers and numerous nodes, which serve the subscribers, for communication. Therefore, it is a critical problem for an operator to provide its subscribers with sufficient IP addresses.

SUMMARY

According to a first aspect of the present disclosure, a method at a first network element for facilitating reuse of an IP address at multiple User Equipments (UEs) comprising a first UE is provided. The method may comprise: transmitting, to a second network element, a first request message associated with the first UE, the first request message comprising the IP address and a first indicator which, in conjunction with the IP address, uniquely identifies a session of the first UE, wherein the first indicator indicates information on an IP address pool applicable to the IP address.

In some embodiments, the method may further comprise: receiving, from the second network element, a first response message associated with the first UE in response to the first request message. In some embodiments, the second network element may be a part of an Authentication, Authorization and Accounting (AAA) server for accounting. In some embodiments, the first request message may be one of: an Accounting-Request START message, an Accounting-Request STOP message, ACR Command, and an Accounting-Request Interim-Update message, and the first response message is a corresponding one of: an Accounting-Response START message, an Accounting-Response STOP message, ACA Command, and an Accounting-Response Interim-Update message.

In some embodiments, before the transmission of the first request message, the method may further comprise: transmitting, to a third network element, a second request message associated with the first UE, the second request message comprising one or more second indicators, each of which indicates an IP address pool from which one or more IP addresses are available to be allocated to the first UE; and receiving, from the third network element, a second response message in response to the second request message, the second response message comprising a third indicator which identifies an IP address pool of the one or more IP addresses pools indicated by the one or more second indicators, wherein the IP address from the identified IP address pool is allocated to the first UE.

In some embodiments, the method may further comprise: selecting a User Plane Function (UPF) for the first UE based at least partially on the third indicator. In some embodiments, the third network element is a part of an AAA server for authentication. In some embodiments, the second request message may be an Access Request message or a Diameter-Extensible Authentication Protocol (EAP)-Request (DER) message, and the second response message is a corresponding one of an Access Accept message or a Diameter-EAP-Answer (DEA) message. In some embodiments, each of the first indicator, one or more second indicators, and the third indicator may comprise a first field uniquely identifying an IP address pool from which the IP address is allocated to the first UE. In some embodiments, each of the first indicator, the one or more second indicators, and the third indicator may further comprise a second field indicating an IP version applicable for the IP address pool identified by the first field. In some embodiments, the second field may indicate one of IPv4, IPv6, or both. In some embodiments, each of the first indicator, the one or more second indicators, and the third indicator may further comprise a third field indicating the length of the first field. In some embodiments, each of the first indicator, the one or more second indicators, and the third indicator may be a 3GPP-IP-Address-Pool-Id attribute, a 3GPP-IP-Address-Pool-Info attribute, or a customized Remote Authentication Dial In User Service (RADIUS) attribute. In some embodiments, the first request message may further comprise a fourth indicator identifying a network to be accessed by the first UE.

In some embodiments, the fourth indicator may be a Called-Station-Id attribute or a customized RADIUS attribute. In some embodiments, the IP address may comprise an IPv4 address, an IPv6 prefix, or both. In some embodiments, the first network element may be a Session Management Function (SMF) or a Packet Data Network (PDN) Gateway for Control Plane (PGW-C).

According to a second aspect of the present disclosure, a method at a second network element for facilitating reuse of an IP address at multiple UEs comprising a first UE is provided. The method may comprise: receiving, from a first network element, a first request message associated with the first UE, the first request message comprising the IP address and a first indicator which, in conjunction with the IP address, uniquely identifies a session of the first UE, wherein the first indicator indicates information on an IP address pool applicable to the IP address; performing processing for the first UE identified by the first indicator in conjunction with the IP address.

In some embodiments, the method may further comprise: transmitting, to the first network element, a first response message associated with the first UE based on a result of the processing. In some embodiments, the second network element may be a part of an Authentication, Authorization and Accounting (AAA) server for accounting. In some embodiments, the first request message may be one of: an Accounting-Request START message, an Accounting-Request STOP message, ACR Command, and an Accounting-Request Interim-Update message, and wherein the first response message may be a corresponding one of: an Accounting-Response START message, an Accounting-Response STOP message, ACA Command, and an Accounting-Response Interim-Update message. In some embodiments, the first indicator may comprise a first field uniquely identifying an IP address pool from which the IP address is allocated to the first UE. In some embodiments, the first indicator may further comprise a second field indicating an IP version of applicable for the IP address pool identified by the first field. In some embodiments, the second field may indicate one of IPv4, IPv6, or both. In some embodiments, the first indicator may further comprise a third field indicating the length of the first field. In some embodiments, the first indicator may be a 3GPP-IP-Address-Pool-Id attribute, a 3GPP-IP-Address-Pool-Info attribute, or a customized Remote Authentication Dial In User Service attribute. In some embodiments, the first request message may further comprise a fourth indicator identifying a network to be accessed by the first UE. In some embodiments, the fourth indicator may be a Called-Station-Id attribute or a customized RADIUS attribute. In some embodiments, the IP address comprises an IPv4 address, an IPv6 prefix, or both. In some embodiments, the first network element may be a Session Management Function (SMF) or a Packet Data Network (PDN) Gateway for Control Plane (PGW-C).

According to a third aspect of the present disclosure, a method at a third network element for facilitating reuse of an IP address at multiple UEs comprising a first UE is provided. The method may comprise: receiving, from a first network element, a second request message associated with the first UE, the second request message comprising one or more second indicators, each of which indicates an IP address pool from which one or more IP addresses are available to be allocated to the first UE; determining a first IP address pool from one or more IP address pools indicated by the one or more second indicators to be allocated to the first UE; and transmitting, to the first network element, a second response message comprising a third indicator which identifies the first IP address pool.

In some embodiments, the third network element may be a part of an AAA server for authentication. In some embodiments, the second request message may be an Access Request message or a Diameter-Extensible Authentication Protocol (EAP)-Request (DER) message, and the second response message is a corresponding one of an Access Accept message or a Diameter-EAP-Answer (DEA) message. In some embodiments, each of the one or more second indicators and the third indicator may comprise a first field uniquely identifying the first IP address pool. In some embodiments, each of the one or more second indicators and the third indicator may further comprise a second field indicating an IP version applicable for the IP address pool identified by the first field. In some embodiments, the second field may indicate one of IPv4, IPv6, or both. In some embodiments, each of the one or more second indicators and the third indicator may further comprise a third field indicating the length of the first field. In some embodiments, each of the one or more second indicators and the third indicator may be a 3GPP-IP-Address-Pool-Id attribute, a 3GPP-IP-Address-Pool-Info attribute, or a customized Remote Authentication Dial In User Service (RADIUS) attribute. In some embodiments, the IP address may comprise an IPv4 address, an IPv6 prefix, or both. In some embodiments, the first network element may be a Session Management Function (SMF) or a Packet Data Network (PDN) GateWay for Control Plane (PGW-C).

According to a fourth aspect of the present disclosure, a first network element is provided. The first network element may comprise: a processor; a memory storing instructions which, when executed by the processor, cause the processor to perform the method at the first network element mentioned above.

According to a fifth aspect of the present disclosure, a second network element is provided. The second network element may comprise: a processor; a memory storing instructions which, when executed by the processor, cause the processor to perform the method at the second network element mentioned above.

According to a sixth aspect of the present disclosure, a third network element is provided. The third network element may comprise: a processor; a memory storing instructions which, when executed by the processor, cause the processor to perform the method at the third network element mentioned above.

According to a seventh aspect of the present disclosure, a telecommunications system is provided. The telecommunication system may comprise: one or more User Equipments; a first network element mentioned above; a second network element mentioned above; and a third network element mentioned above.

According to an eighth aspect of the present disclosure, a non-transitory computer readable storage medium storing instructions is provided. The instructions, when executed by a processor, cause the processor to perform any of the methods mentioned above.

According to a ninth aspect of the present disclosure, a method at a first network element for facilitating reuse of an Internet Protocol (IP) address at multiple User Equipments (UEs) comprising a first UE, is provided. The method may comprise: transmitting to a second network element, a request message associated with the first UE, the first request message comprising an indicator which indicates information on IP address pool, wherein the information on IP address pool indicates the IP version of the IP address pool; and receiving, from the third network element, a response message in response to the request message, the response message comprising the indicator which indicates information on IP address pool, wherein the information on IP address pool indicates the IP version of the IP address pool. In some embodiments, the request message may be one of: Access request message, accounting request message, DER Command, AAR Command, and ACR Command; the response message may be one of: Access accept message, accounting response message, DEA message, AAA Command, and ACA Command.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Figure 1:
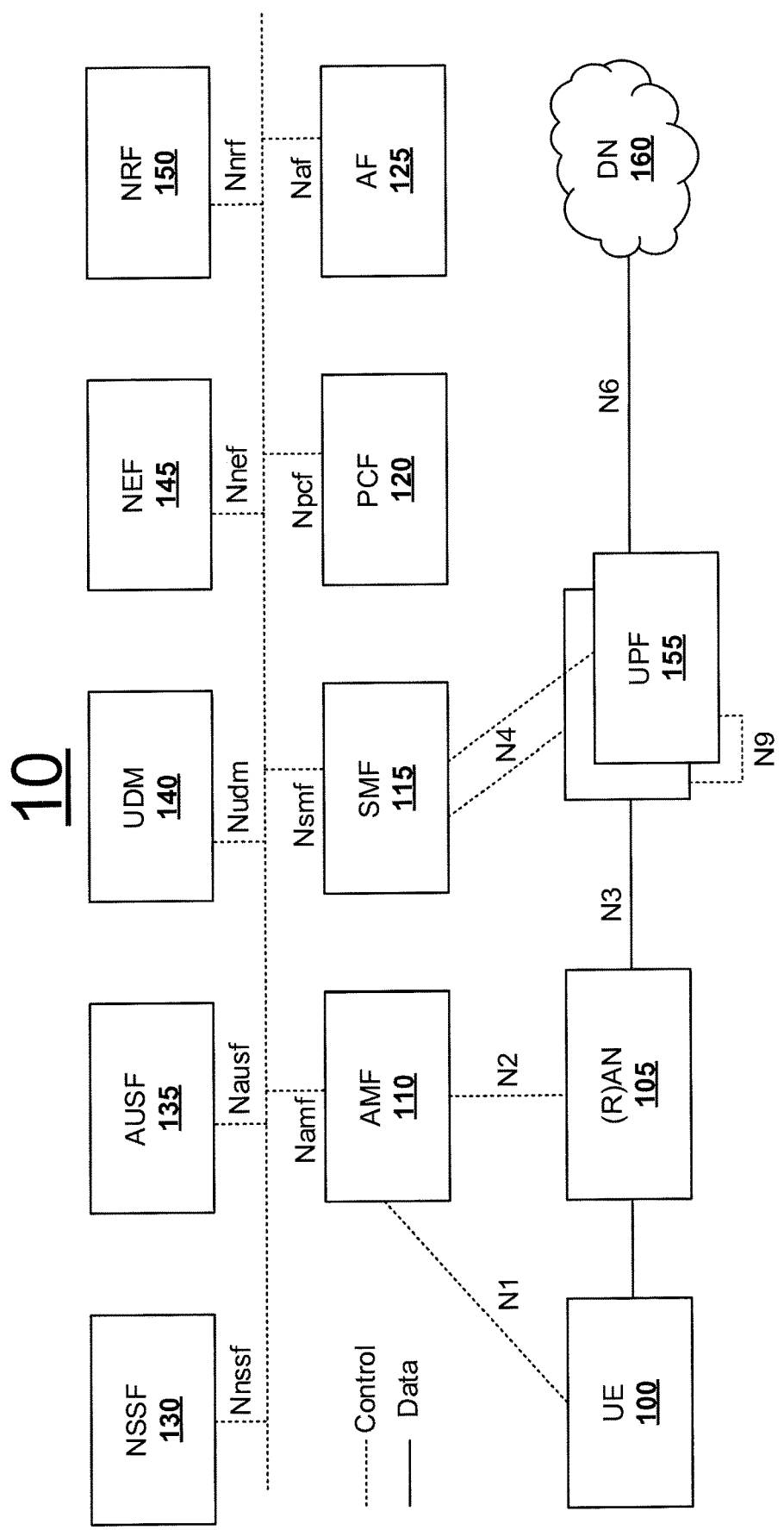
FIG. 1 is an overview diagram illustrating a typical 5G New Radio (NR) network architecture according to an embodiment of the present disclosure.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as IP address reuse is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division—Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, a wireless device, a wireless terminal, or any other equivalents. For another example, the term "gNB" used herein may refer to a base station, a base transceiver station, an access point, a hot spot, a NodeB, an Evolved NodeB, a network element, or any other equivalents. Further, the term "network element" used herein may refer to a network function, a network entity, a node, a network equipment, or any other device on the network side. Further, please note that the term "indicator" used herein may refer to an attribute, a setting, a configuration, a profile, an identifier, a field, one or more bits/octets, or any data by which information of interest may be indicated directly or indirectly.

The 5G Core Network has been designed around services that are invoked using a standard Application Programming Interface (API). On the surface, the 5G architecture looks very different from the 4G Evolved Packet Core (EPC) but on close inspection, one can see the evolution from the 4G architecture to the 5G architecture.

For example, the 5G core has evolved from the 4G EPC in two steps:
 Control and User Plane Separation (CUPS) of the 4G EPC; and
 Reorganizing the 4G EPC CUPS functions into services.
CUPS The introduction of control and user plane separation in the 4G EPC is the first step towards the 5G architecture. The Serving GateWay (SGW) and Packet Data Network (PDN) GateWay (PGW) functions were split into a control and data plane component:
 SGW→SGW-C and SGW-U
 PGW→PGW-C and PGW-U
Reorganization to Services With the separation of control and user plane functions, the split functions are reorganized into new network functions, such as Access and Mobility Function (AMF), Session Management Function (SMF), User Plane Function (UPF), etc. In general, an AMF in 5G performs most of the functions which were previously performed by a Mobility Management Entity (MME) in 4G, an SMF performs rest of the functions which were previously performed by the MME in addition to the control plane (CP) functions which were previously performed by SGW and PGW, and a UPF performs the user plane (UP) functions which were previously performed by SGW and PGW. In such a manner, the 4G EPC components have been reorganized into service-oriented functions. Therefore, any reference to a network function defined for 5G may also be applicable to a node defined for 4G or any other appropriate telecommunication technologies. For example, when "SMF" is recited in some embodiments, "PGW-C" or "SGW-C" may be equally applicable. For example, when "UPF" is recited in some embodiments, "PGW-U" or "SGW-U" may be equally applicable.

FIG. 1 is an overview diagram illustrating a typical 5G New Radio (NR) network architecture 10 according to an embodiment of the present disclosure. As shown in FIG. 1, the network 10 may comprise one or more UEs 100 and a (radio) access network ((R)AN) 105, which could be a base station, a Node B, an evolved NodeB (eNB), a gNB, or any entity which provides access to the UEs 100. Further, the network 10 may comprise its core network portion comprising (but not limited to) an AMF 110, an SMF 115, a Policy Control Function (PCF) 120, an Application Function (AF) 125, a Network Slice Selection Function (NSSF) 130, an AUthentication Server Function (AUSF) 135, a Unified Data Management (UDM) 140, a Network Exposure Function (NEF) 145, a Network Repository Function (NRF) 150, and a UPF 155. As shown in FIG. 1, these entities may communicate with each other via the service-based interfaces, such as, Namf, Nsmf, Npcf, etc. and/or the reference points, such as, N1, N2, N3, N6, N9, etc.

However, the present disclosure is not limited thereto. In some other embodiments, the network 10 may comprise additional network functions, less network functions, or some variants of the existing network functions shown in FIG. 1. For example, in a network with the 4G architecture, the entities which perform these functions may be different from those shown in FIG. 1. For another example, in a network with a mixed 4G/5G architecture, some of the entities may be same as those shown in FIG. 1, and others may be different. Further, the functions shown in FIG. 1 are not essential to the embodiments of the present disclosure. In other words, some of them may be missing from some embodiments of the present disclosure.

Here, some of the functions shown in FIG. 1, such as AMF 110, SMF 115, and UPF 155, which may be involved in the embodiments of the present disclosure will be described in detail below.

Referring to FIG. 1, the AMF 110 may perform most of the functions that the MME performs in a 4G network as mentioned above. Below please find a brief list of some of its functions:
 Terminates the RAN CP interface (N2);
 Non-access stratum (NAS) signaling;
 NAS ciphering and integrity protection;
 Mobility Management (MM) layer NAS termination;
 Session Management (SM) layer NAS forwarding;
 Authenticates UE;
 Manages the security context;
 Registration management;
 Connection management;
 Reachability management;
 Mobility Management; and
 Apply mobility related policies from PCF (e.g. mobility restrictions).

Further, the SMF 115 may perform the session management functions that are handled by the 4G MME, SGW-C, and PGW-C. Below please find a brief list of some of its functions:

Allocates IP addresses to UEs;
NAS signaling for session management (SM);
Sends QoS and policy information to RAN via the AMF;
Downlink data notification;
Select and control UPF for traffic routing;
Acts as the interface for all communication related to offered user plane services; and
Lawful intercept—control plane.

Further, the UPF 155 is essentially a fusion of the data plane parts of the SGW and PGW, as mentioned above. In the context of the CUPS architecture: EPC SGW-U+EPC PGW-U→5G UPF.

The UPF 155 may perform the following functions:
Packet routing and forwarding
Packet inspection and QoS handling, and the UPF may optionally integrate a Deep Packet Inspection (DPI) for packet inspection and classification;
Connecting to the Internet POP (Point of Presence), and the UPF may optionally integrate the Firewall and Network Address Translation (NAT) functions;
Mobility anchor for Intra RAT and Inter-RAT handovers;
Lawful intercept—user plane; and
Maintains and reports traffic statistics.

As shown in FIG. 1, the UPF 155 is communicatively connected to the Data Network (DN) 160 which may be, or in turn communicatively connected to, the Internet, such that the UE 100 may finally communicate its user plane data with other devices outside the network 10, for example, via the RAN 105 and the UPF 155.

As mentioned above, in order to support more IP addresses for a large amount of UEs in a large operator network, the operator may have the requirement to deploy same IP address ranges to multiple UPFs with different firewalls/NAT, for example, that shown in FIG. 2, which will be described in detail below. With the NAT technology, traffic associated with different Protocol Data Unit (PDU) sessions having a same Access Point Name (APN) or a Data Network Name (DNN) and having a same private IPv4 address can be transferred without any problem on the Internet. However, this deployment may cause some troubles for some functions within the network 10. Next, this issue will be explained in detail with reference to FIG. 2.

Figure 2:
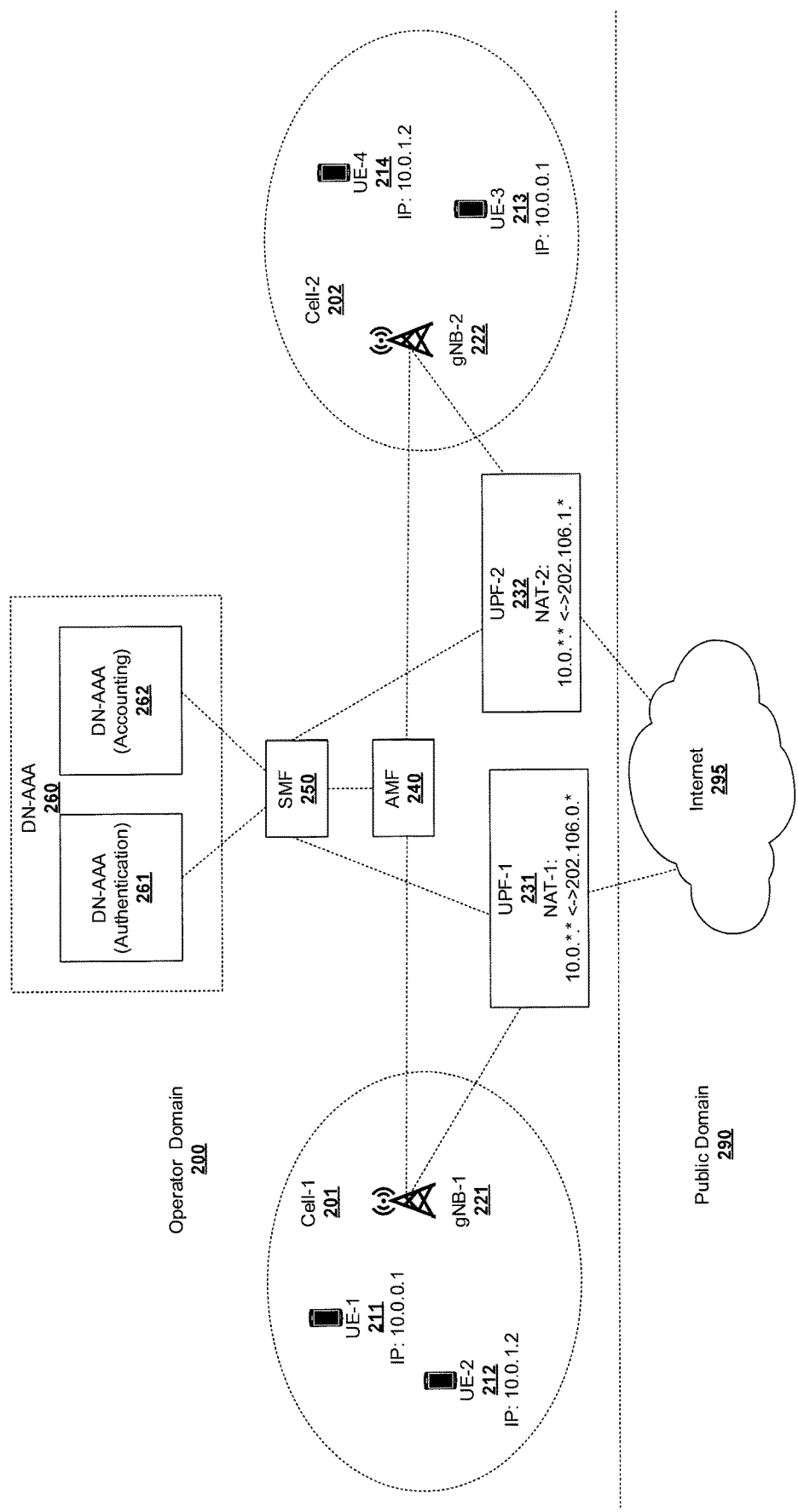
FIG. 2 is a diagram illustrating a telecommunication system to which a method for reusing IP addresses at multiple UEs according to an embodiment of the present disclosure is applicable.

FIG. 2 is a diagram illustrating a telecommunication system (or the operator domain) 200 to which a method for reusing IP addresses at multiple UEs according to an embodiment of the present disclosure is applicable. As shown in FIG. 2, the telecommunication system or the operator domain 200 may comprise one or more UEs 211, 212, 213, 214 and their serving access nodes, gNB-1 221 and gNB-2 222, which provide access to the UEs in their serving cells, Cell-1 201 and Cell-2 202, respectively. Further, the operator domain 200 may comprise one or more UPFs, for example, the UPF-1 231 and the UPF-2 232, via which the UEs 211, 212, 213, and 214 may communicate their user plane data with the Internet 295, respectively. Further, the operator domain 200 may comprise an AMF 240, an SMF 250, and a DN-Authentication, Authorization & Accounting (DN-AAA) server 260. Further, some of the components are omitted from FIG. 2 for simplicity, for example, a PCF, an AF, a NSSF, etc., as those shown in FIG. 1, since they are not directly involved in the embodiments of the present disclosure.

However, this deployment is only for the purpose of illustration rather than limiting of the present disclosure. In some other embodiments, the operator domain 200 may comprise more UEs, gNBs, UPFs, AMFs, SMFs, and/or DN-AAAs, or may have different configurations thereof and/or different connections therebetween.

As mentioned above, the operator would like to reuse their IP addresses for different UEs, and therefore the NAT technology is used at UPF-1 231 and UPF-2 232. For example, as shown in FIG. 2, a NAT rule, NAT-1, may be configured at UPF-1 231, which serves UE-1 211 and UE-2 212. This NAT-1 may translate an IPv4 address in a private IP address range "10.0.*.*" into an IPv4 address in a public IP address range "202.106.0.*" and vice versa. Similarly, another NAT rule, NAT-2, may be configured at UPF-2 232, which serves UE-3 213 and UE-4 214. This NAT-2 may translate the same private IP address range "10.0.*.*" into another public IP address range "202.106.1.*" and vice versa. In other words, multiple UPFs may maintain their own private IP address ranges, respectively, which could be completely or partially identical. With this configuration, all of the UEs, UE-1 211, UE-2 212, UE-3 213, and UE-4 214 may communicate with the Internet 295 with a limited number of public IP addresses.

However, as also mentioned above, some of the nodes in the operator domain 200 may not be aware of the presence of the NAT rules. For example, a part of the DN-AAA server 260, which is in charge of its accounting business, (below, "DN-AAA/Accounting 262") may not be aware of the presence of the NAT rules since it may be located on the same side of the NAT as the UEs, and therefore it cannot distinguish the UE-1 211 from the UE-3 213 or the UE-2 212 from the UE-4 214 since these UEs may share a same private IP address and even a same APN/DNN.

To be specific, according to the clause 5.6.6, 3GPP TS 23.501 V16.4.0 (2020 March), the DN-AAA server 260 may be located within the operator domain 200 as shown in FIG. 2, instead of outside the operator domain 200. Further, according to the clause 16.4.3, 3GPP TS 29.061 V15.5.0 (2018 December), an Accounting-Request Start message sent to the DN-AAA/Accounting 262 comprise no attribute or indicator by which the DN-AAA/Accounting 262 can distinguish a PDU session from another PDU session having a same (private) IP address and a same APN/DNN. In other words, the reuse of an IP address at multiple UEs is not supported by the current 3GPP standards.

Therefore, in some embodiments of the present disclosure, one or more indicators in such messages, either an existing attribute or a new attribute, may be used to enable a node in the operator domain 200 to distinguish one PDU session from another PDU session having the same IP address and APN/DNN.

In some embodiments, an existing Remote Authentication Dial In User Service (RADIUS) attribute, for example, "3GPP-IP-Address-Pool-Id" which is defined in the clause 11.3.1, 3GPP TS 29.561 V16.3.0 (2020 March), may be reused to, in conjunction with an IP address allocated to a UE, uniquely identify a PDU session of the UE or the UE itself, according to some embodiments of the present application. However, the current definition of the attribute "3GPP-IP-Address-Pool-Id" in the TS 29.561 is read as follows:

The SMF may determine an IP address pool ID based on UPF ID, S-NSSAI, DNN, and IP version as described in subclause 5.8.2.2.1 in 3GPP TS 23.501 [2] and includes the IP address pool ID within 3GPP-IP-Address-Pool-Id and send it to the DN-AAA. The DN-AAA assigns IPv6 prefix or IPv4 address from the requested IP address pool. Multiple 3GPP-IP-Address-Pool-Id sub-attributes may be sent in the RADIUS Access-Request message.

. . .

| 118 | 3GPP-IP-Address-Pool-Id | It indicates the IP address pool identifier. | Optional | Access-Request | IpAddrPool |
|---|---|---|---|---|---|

Therefore, it can only be used in an Access-Request by an SMF (e.g. the SMF 250) to inform the DN-AAA/Authentication (e.g. the DN-AAA/Authentication 261) of the available IP address pools at UPFs (e.g. the UPF-1 231, the UPF-2 232), and none of the SMF and DN-AAA/Accounting (e.g. the DN-AAA/Accounting 262) may be aware of which IP address pool is selected and from which IP address pool the allocated IP address is selected by the DN-AAA/Authentication. Therefore, according to some embodiments of the present disclosure, a reuse and revise of this existing attribute is proposed, for example, it may be used in an Accounting-Request message (e.g., Accounting-Request Start, Accounting-Request Stop, Accounting-Request Interim Update) and/or an Accounting-Response message (e.g., Accounting-Response Start, Accounting-Response Stop, Accounting-Response Interim Update).

Further, according to some embodiments of the present disclosure, the attribute "3GPP-IP-Address-Pool-Id" may also be reused in an Access-Accept message, in addition to an Access-Request message, to indicate which IP address pool is selected by the DN-AAA/Authentication from the multiple IP address pools corresponding to multiple UPFs.

Furthermore, according to some embodiments of the present disclosure, this attribute may be used in other messages sent to a network function or a node if the network function or the node which cannot distinguish a PDU session from another PDU session based on IP address and/or APN/DNN only.

In such cases, the definition of the attribute may be revised as follows:

| 118 | 3GPP-IP-Address-Pool-Id | It indicates the IP address pool identifier. | Optional | Access-Request Access-Accept Accounting-Request START, Accounting-Request STOP, Accounting-Request Interim-Update | IpAddrPool |
|---|---|---|---|---|---|

Further, for Access-Request or Diameter EAP Request (DER) command from the SMF to the DN-AAA server with 3GPP VSA 3GPP-Allocate-IP-Type set to value 3 (i.e. requesting both v4 and v6), the AAA server does not know which pool id corresponds to which IP version, since the N5 interface as specified in 3GPP TS 29.512 has different settings for IPv4 index and IPv6 index. In such a case, additional information for IP version in a message may be needed to distinguish one IP address pool from another with a different IP version.

Therefore, in some embodiments, a new RADIUS attribute, for example, "3GPP-IP-Address-Pool-Info" may be used to, in conjunction with an IP address allocated to a PDU session or a UE, uniquely identify the PDU session or the UE. An exemplary proposed revision to the related 3GPP standard, 3GPP TS 29.561, is given below:

Proposed Changes:

*1st Change*

11.3.1 General

RADIUS attributes as defined in subclause 16.4 of 3GPP TS 29.061 [5] are re-used in 5G with the following differences:

SMF replaces P-GW. GGSN and PPP PDP type related description are not applicable for 5G.

5G QoS flow replaces IP-CAN bearer and PDU session replaces IP-CAN session.

N6 replaces Gi/Sgi and UE replaces MS.

DNN replaces APN.

Detailed information needed for 5G compared to 3GPP TS 29.061 [5] is described below.

TABLE 11.3-1

Additional information needed for 5G compared to the RADIUS attributes defined in 3GPP TS 29.061 [5]

| Attr # | Attribute Name | Description | Content | Presence Requirement | Applicable message |
|---|---|---|---|---|---|
| 79 | EAP-Message | This attribute encapsulates EAP message (as defined in IETF RFC 3748 [6]) exchanged between the SMF and DN-AAA, see IETF RFC 3579 [7] for details. | String | Conditional NOTE | Access-Request, Access-Accept, Access-Reject, CoA-Request, CoA-ACK, Disconnect-Request, Disconnect-ACK |
| | | | | Mandatory | Access-Challenge |
| 80 | Message-Authenticator | This attribute includes the message authenticator, see IETF RFC 3579 [7] for details. | String | Conditional NOTE | Access-Request, Access-Accept, Access-Reject, CoA-Request, CoA-ACK, CoA-NAK Disconnect-Request, Disconnect-ACK, Disconnect-NAK |
| | | | | Mandatory | Access-Challenge |

NOTE:
Shall be present if EAP is used.

TABLE 11.3-2

Different information needed for 5G compared to the RADIUS VSA defined in subclause 16.4.7 of 3GPP TS 29.061 [5]

| Sub-attr # | Sub-attribute Name | Differences |
|---|---|---|
| 1 | 3GPP-IMSI | Re-used. |
| 2 | 3GPP-Charging-Id | Re-used. |
| 3 | 3GPP-PDP-Type | Re-used. For SMF, this sub-attribute represents PDU session type and only the values "0", "2", "3", "5" and "6" are applicable. |
| 4 | 3GPP-CG-Address | Re-used. |
| 5 | 3GPP-GPRS-Negotiated-QoS-Profile | Re-used. For SMF, it uses the format for Release indicator value "15" as defined in 3GPP TS 29.061 [5]. |
| 6 | 3GPP-SGSN-Address | Re-used. It includes AMF IPv4 address. |
| 7 | 3GPP-GGSN-Address | Re-used. It includes (home) SMF control plane IPv4 address. |
| 8 | 3GPP-IMSI-MCC-MNC | Re-used. |
| 9 | 3GPP-GGSN-MCC-MNC | Re-used. MCC and MNC of the network the (home) SMF belongs to. |
| 10 | 3GPP-NSAPI | Re-used. It identifies QFI with value range 0-255. |
| 11 | 3GPP-Session-Stop-Indicator | Re-used. |
| 12 | 3GPP-Selection-Mode | Re-used. SMF maps the selection mode value from the enumeration value of DnnSelectionMode in 3GPP TS 29.502 [40]. |
| 13 | 3GPP-Charging-Characteristics | Re-used. |
| 14 | 3GPP-CG-Ipv6-Address | Re-used. |
| 15 | 3GPP-SGSN-Ipv6-Address | Re-used. It includes AMF IPv6 address. |
| 16 | 3GPP-GGSN-Ipv6-Address | Re-used. It includes (home) SMF control plane IPv6 address. |
| 17 | 3GPP-Ipv6-DNS-Servers | Re-used. |
| 18 | 3GPP-SGSN-MCC-MNC | Re-used. MCC and MNC of the network the AMF belongs to |
| 19 | 3GPP-Teardown-Indicator | Re-used. |
| 20 | 3GPP-IMEISV | Re-used. |
| 21 | 3GPP-RAT-Type | Re-used. For SMF, it uses the sub-attribute definition for P-GW and only the values "3", "7" and "51" are applicable. |
| 22 | 3GPP-User-Location-Info | Re-used. For SMF, only the values "128", "129", "130", "135" and "136" of Geographic Location Type are applicable. |
| 23 | 3GPP-MS-TimeZone | Re-used. |
| 24 | 3GPP-CAMEL-Charging-Info | Not applicable. |
| 25 | 3GPP-Packet-Filter | Re-used. |
| 26 | 3GPP-Negotiated-DSCP | Re-used. |
| 27 | 3GPP-Allocate-IP-Type | Re-used. |
| 28 | External-Identifier | Re-used. |
| 29 | TWAN-Identifier | Not applicable. |
| 30 | 3GPP-User-Location-Info-Time | Re-used. |
| 31 | 3GPP-Secondary-RAT-Usage | Not applicable. |
| 110 | 3GPP-Notification | Added. |
| 111 | 3GPP-UE-MAC-Address | Added. |

TABLE 11.3-2-continued

Different information needed for 5G compared to the RADIUS
VSA defined in subclause 16.4.7 of 3GPP TS 29.061 [5]

| Sub-attr # | Sub-attribute Name | Differences |
|---|---|---|
| 112 | 3GPP-Authorization-Reference | Added. |
| 113 | 3GPP-Policy-Reference | Added. |
| 114 | 3GPP-Session-AMBR | Added. |
| 115 | 3GPP-NAI | Added. |
| 116 | 3GPP-Session-AMBR-v2 | Added. |
| 117 | 3GPP-Supported-Features | Added. |
| 118 | 3GPP-IP-Address-Pool-Info | Added. |

NOTE:
5G specific RADIUS VSAs are numbered from 110.

110—3GPP-Notification

| Octets | Bits |  |  |  |  |  |  |  |
|---|---|---|---|---|---|---|---|---|
|  | 8 | 7 | 6 | 5 | 4 | 3 | 2 | 1 |
| 1 | 3GPP type = 110 |  |  |  |  |  |  |  |
| 2 | 3GPP Length = 3 |  |  |  |  |  |  |  |
| 3 | Spare |  |  |  |  |  | ACC | AUTH |

3GPP Type: 110
Length: 3
Octet 3 is Octet String type.
For bit 1 AUTH,
  if the value of AUTH is set to "1", and there is IPv4 address and/or IPv6 prefix change (not allocated/de-allocated by the DN-AAA itself) and the PDU session is not terminated, the SMF shall send Access-Request message to the DN-AAA with GPSI in Calling-Station-Id or External-Identifier attribute and IP address in:
  1) Framed-IP-Address and Framed-Ipv6-Prefix, if both IPv4 address and IPv6 prefix(es) exist for the PDU session; or
  2) Framed-IP-Address, if only IPv4 address exists for the PDU session; or
  3) Framed-Ipv6-Prefix, if only IPv6 prefix(es) exists for the PDU session.
  For Ethernet PDU session, if there is UE MAC address change, the SMF shall send Access-Request message to the DN-AAA with GPSI in Calling-Station-Id or External-Identifier attribute and the complete list of used UE MAC addresses in the 3GPP-UE-MAC-Address attribute.
  if the value is set to "0", the SMF may notify authentication DN-AAA with the UE address and GPSI based on local configuration.
For bit 2 ACC,
  if the value is set to "1", and there is IPv4 address and/or IPv6 prefix change (not allocated/de-allocated by the DN-AAA itself) and the PDU session is not terminated, the SMF shall send Accounting-Request Interim-Update message to the DN-AAA with GPSI in Calling-Station-Id or External-Identifier attribute and IP address in:
  1) Framed-IP-Address and Framed-Ipv6-Prefix, if both IPv4 address and IPv6 prefix(es) exist for the PDU session; or
  2) Framed-IP-Address, if only IPv4 address exists for the PDU session; or
  3) Framed-Ipv6-Prefix, if only IPv6 prefix(es) exists for the PDU session.
  For Ethernet PDU session, if there is UE MAC address change, the SMF shall send Accounting-Request Interim-Update message to the DN-AAA with GPSI in Calling-Station-Id or External-Identifier attribute and the complete list of used UE MAC addresses in the 3GPP-UE-MAC-Address attribute.
  if the value is set to "0", the SMF may notify accounting DN-AAA with the UE address and GPSI based on local configuration.

111—3GPP-UE-MAC-Address

| Octets | Bits |  |  |  |  |  |  |  |
|---|---|---|---|---|---|---|---|---|
|  | 8 | 7 | 6 | 5 | 4 | 3 | 2 | 1 |
| 1 | 3GPP type = 111 |  |  |  |  |  |  |  |
| 2 | 3GPP Length = 8 |  |  |  |  |  |  |  |
| 3-10 | MAC Address (octet string) |  |  |  |  |  |  |  |

3GPP Type: 111
Length: 8
It is sent from the DN-AAA to authorize UE MAC addresses. Multiple 3GPP-MAC-Address sub-attributes (maximum 16) may be sent in one RADIUS CoA or Access-Accept message. The DN-AAA shall always provide the full list of allowed MAC addresses, and SMF shall replace the existing list with the newly received one. When omitted, there is no restriction and all UE MAC addresses are permitted for the Ethernet PDU session.
When sending from the SMF to the DN-AAA, it indicates UE MAC addresses in use. Multiple 3GPP-MAC-Address sub-attributes may be sent in one RADIUS Access-Request or Accounting-Request Interim-Update message.
MAC address is Octet String type.

112—3GPP-Authorization-Reference

| Octets | Bits |  |  |  |  |  |  |  |
|---|---|---|---|---|---|---|---|---|
|  | 8 | 7 | 6 | 5 | 4 | 3 | 2 | 1 |
| 1 | 3GPP type = 112 |  |  |  |  |  |  |  |
| 2 | 3GPP Length = m |  |  |  |  |  |  |  |
| 3-m | Authorization Data Reference (octet string) |  |  |  |  |  |  |  |

3GPP Type: 112
Length: m
Authorization Data Reference: Octet String. It is sent from the DN-AAA to refer to the local authorization data in the SMF.

113—3GPP-Policy-Reference

| Octets | Bits | | | | | | | |
|---|---|---|---|---|---|---|---|---|
| | 8 | 7 | 6 | 5 | 4 | 3 | 2 | 1 |
| 1 | 3GPP type = 113 | | | | | | | |
| 2 | 3GPP Length = m | | | | | | | |
| 3-m | Policy Data Reference (octet string) | | | | | | | |

3GPP Type: 113
Length: m
Policy Data Reference: Octet String. It is sent from the DN-AAA and used by the SMF to retrieve the SM or QoS policy data from the PCF.

114—3GPP-Session-AMBR

| Octets | Bits | | | | | | | |
|---|---|---|---|---|---|---|---|---|
| | 8 | 7 | 6 | 5 | 4 | 3 | 2 | 1 |
| 1 | 3GPP type = 114 | | | | | | | |
| 2 | 3GPP Length = m | | | | | | | |
| 3-m | Session AMBR (octet string) | | | | | | | |

3GPP Type: 114
Length: m
Session AMBR: Octet String. It is sent from the DN-AAA to authorize the PDU Session AMBR. The encoding is defined as BitRate in 3GPP TS 29.571 [39].

115—3GPP-NAI

| Octets | Bits | | | | | | | |
|---|---|---|---|---|---|---|---|---|
| | 8 | 7 | 6 | 5 | 4 | 3 | 2 | 1 |
| 1 | 3GPP type = 115 | | | | | | | |
| 2 | 3GPP Length = m | | | | | | | |
| 3-m | NAI (octet string) | | | | | | | |

3GPP Type: 115
Length: m
NAI: Octet String. It shall be formatted according to subclause 14.3 of
3GPP TS 23.003 [28] that describes an NAI.

116—3GPP-Session-AMBR-v2

| Octets | Bits | | | | | | | |
|---|---|---|---|---|---|---|---|---|
| | 8 | 7 | 6 | 5 | 4 | 3 | 2 | 1 |
| 1 | 3GPP type = 116 | | | | | | | |
| 2 | 3GPP Length = m | | | | | | | |
| 3 | Spare | | | | | | DL | UL |
| 4-5 | UL Session-AMBR length (octet string) | | | | | | | |
| 6-m | UL Session-AMBR (octet string) | | | | | | | |
| (m + 1)-(m + 2) | DL Session-AMBR length (octet string) | | | | | | | |
| (m + 3)-n | DL Session-AMBR (octet string) | | | | | | | |

3GPP Type: 116
Length: m
Octet 3 is Octet String type.
Bit 1 UL and bit 2 DL indicate if the corresponding UL and DL Session-AMBR shall be present in a respective field or not. If one of these bits is set to "0", the corresponding field shall not be present at all.

UL/DL Session AMBR: Octet String. It is sent from the DN-AAA to authorize the PDU Session AMBR. The encoding is defined as BitRate in 3GPP TS 29.571 [39].
If the feature eSessionAMBR is supported and if applicable, the DN-AAA shall send this VSA; otherwise, the DN-AAA shall send the VSA 3GPP-Session-AMBR.

117—3GPP-Supported-Features

| Octets | Bits | | | | | | | |
|---|---|---|---|---|---|---|---|---|
| | 8 | 7 | 6 | 5 | 4 | 3 | 2 | 1 |
| 1 | 3GPP type = 117 | | | | | | | |
| 2 | 3GPP Length = m | | | | | | | |
| 3-6 | Vendor ID (octet string) | | | | | | | |
| 7-10 | Feature List ID (octet string) | | | | | | | |
| 11-14 | Feature List (octet string) | | | | | | | |

3GPP Type: 117
Length: m
This VSA may be present in the Access-Request (initial one) message and either the Access-Challenge (initial one) or the Access-Accept message. If present, this VSA informs the destination entity about the features that the origin entity requires to successfully complete the message exchange. The Vendor ID, Feature List ID and Feature List are encoded according to 3GPP TS 29.229 [41]. See clause 12.4.1 for more detailed information regarding the general principle of the feature negotiation with the difference that RADIUS terms replace Diameter terms. The table 12.4.1-1 defines the features applicable to the RADIUS N6 interfaces for the feature lists with a Feature-List-ID of 1.

118—3GPP-IP-Address-Pool-Info

| Octets | Bits | | | | | | | |
|---|---|---|---|---|---|---|---|---|
| | 8 | 7 | 6 | 5 | 4 | 3 | 2 | 1 |
| 1 | 3GPP type = 118 | | | | | | | |
| 2 | 3GPP Length = m | | | | | | | |
| 3 | Spare | | | | | | IP version | |
| 4-5 | IP address pool id length (octet string) | | | | | | | |
| 6-m | IP address pool id (octet string) | | | | | | | |

3GPP Type: 118
Length: m
Octet 3 is Octet String type.
    For bit 1 and bit 2 IP version:
        if the value is set to "0", it indicates the IP address pool id is applicable for both IPv4 and IPv6;
        if the value is set to "1", it indicates the IP address pool id is applicable for IPv4;
        if the value is set to "2" it indicates the IP address pool id is applicable for IPv6; and
        value "3" is reserved.
The SMF may determine an IP address pool ID based on UPF ID, S-NSSAI, DNN, and IP version as described in subclause 5.8.2.2.1 in 3GPP TS 23.501 [2] and includes the IP address pool ID within 3GPP-IP-Address-Pool-Info and send it to the DN-AAA. The DN-AAA assigns IPv6 prefix or IPv4 address from the requested IP address pool. Multiple 3GPP-IP-Address-Pool-Info sub-attributes may be sent in the RADIUS Access-Request message. The DN-AAA shall include the selected IP address pool in the 3GPP-IP-Address-Pool-Info sub-attribute of the RADIUS Access-Accept message. For accounting, if Framed-IP-Address or Framed-Ipv6-Prefix attribute is included in RADIUS Accounting-Request (START/Interim-Update/STOP), the SMF shall also include the 3GPP-IP-Address-Pool-Info sub-attribute.

Table 11.3-3 describes the sub-attributes of the 3GPP Vendor-Specific attribute described above in different RADIUS messages.

TABLE 11.3-3

| | List of the 3GPP Vendor-Specific sub-attributes for N6 | | | | |
|---|---|---|---|---|---|
| Sub-attr # | Sub-attribute Name | Description | Presence Requirement | Associated attribute (Location of Sub-attr) | Applicability |
| 110 | 3GPP-Notification | It includes all notifications that the DN-AAA wants to receive from the SMF. | Optional | Access-Accept | |
| 111 | 3GPP-UE-MAC-Address | It is sent from the DN-AAA to authorize UE MAC addresses, or it indicates UE MAC addresses in use when sending from the SMF to the DN-AAA. | Optional | Access-Request, Access-Response, Accounting-Request Interim-Update, Change-of-Authorization | |
| 112 | 3GPP-Authorization-Reference | It is sent from the DN-AAA to refer to the local authorization data in the SMF. | Optional | Access-Accept, Change-of-Authorization | |
| 113 | 3GPP-Policy-Reference | It is sent from the DN-AAA and used by the SMF to retrieve the SM or QoS policy data from the PCF. | Optional | Access-Accept, Change-of-Authorization | |
| 114 | 3GPP-Session-AMBR | It is sent from the DN-AAA to authorize the PDU Session AMBR. | Optional | Access-Accept, Change-of-Authorization | |
| 115 | 3GPP-NAI | The Network Access Identifier identifying the UE. | Optional | Access-Request, Accounting-Request START, Accounting-Request STOP, Accounting-Request Interim-Update | |
| 116 | 3GPP-Session-AMBR-V2 | It is sent from the DN-AAA to authorize the PDU Session AMBR, it includes separate session AMBR for UL and DL. | Optional | Access-Accept, Change-of-Authorization | eSession AMBR |
| 117 | 3GPP-Supported-Features | It indicates the supported features as specified in clause 12.4.1. | Optional | Access-Request, Access-Accept, Access-Challenge, Accounting-Request START, Accounting-Response START | |
| 118 | 3GPP-IP-Address-Pool-Info | It indicates the IP address pool identifier. | Optional | Access-Request, Access-Accept, Accounting-Request START, Accounting-Request STOP, Accounting-Request Interim-Update | IpAddrPool |

RADIUS attributes related to the DN-AAA initiated re-authorization and authentication challenge are described in the following subclauses.

*Next Change*

12.4.0 General

Table 12.4-1 lists the Diameter AVPs re-used by the N6 reference point from existing Diameter Applications, reference to the respective specifications and a short description of the usage within the N6 reference point.

TABLE 12.4-1

N6 re-used Diameter AVPs

| Attribute Name | AVP Code | Section defined | Value Type (NOTE 2) | AVP Flag rules (NOTE 1) | | | | May Encr. | Applicability |
|---|---|---|---|---|---|---|---|---|---|
| | | | | Must | May | Should not | Must not | | |
| 3GPP-IMSI | 1 | 3GPP TS 29.061 [5] (NOTE 3) | UTF8String | V | P | | M | Y | |
| 3GPP-Charging-Id | 2 | 3GPP TS 29.061 [5] (NOTE 3) | OctetString | V | P | | M | Y | |
| 3GPP-PDP-Type | 3 | 3GPP TS 29.061 [5] (NOTE 3) | Enumerated | V | P | | M | Y | |
| 3GPP-CG-Address | 4 | 3GPP TS 29.061 [5] (NOTE 3) | OctetString | V | P | | M | Y | |
| 3GPP-GPRS-Negotiated-QoS-Profile | 5 | 3GPP TS 29.061 [5] (NOTE 3) | UTF8String | V | P | | M | Y | |
| 3GPP-SGSN-Address | 6 | 3GPP TS 29.061 [5] (NOTE 3) | OctetString | V | P | | M | Y | |
| 3GPP-GGSN-Address | 7 | 3GPP TS 29.061 [5] (NOTE 3) | OctetString | V | P | | M | Y | |
| 3GPP-IMSI-MCC-MNC | 8 | 3GPP TS 29.061 [5] (NOTE 3) | UTF8String | V | P | | M | Y | |
| 3GPP-GGSN-MCC-MNC | 9 | 3GPP TS 29.061 [5] (NOTE 3) | UTF8String | V | P | | M | Y | |
| 3GPP-NSAPI | 10 | 3GPP TS 29.061 [5] (NOTE 3) | OctetString | V | P | | M | Y | |
| 3GPP-Selection-Mode | 12 | 3GPP TS 29.061 [5] (NOTE 3) | UTF8String | V | P | | M | Y | |
| 3GPP-Charging-Characteristics | 13 | 3GPP TS 29.061 [5] (NOTE 3) | UTF8String | V | P | | M | Y | |
| 3GPP-CG-Ipv6-Address | 14 | 3GPP TS 29.061 [5] (NOTE 3) | OctetString | V | P | | M | Y | |
| 3GPP-SGSN-Ipv6-Address | 15 | 3GPP TS 29.061 [5] (NOTE 3) | OctetString | V | P | | M | Y | |
| 3GPP-GGSN-Ipv6-Address | 16 | 3GPP TS 29.061 [5] (NOTE 3) | OctetString | V | P | | M | Y | |
| 3GPP-Ipv6-DNS-Servers | 17 | 3GPP TS 29.061 [5] (NOTE 3) | OctetString | V | P | | M | Y | |
| 3GPP-SGSN-MCC-MNC | 18 | 3GPP TS 29.061 [5] (NOTE 3) | UTF8String | V | P | | M | Y | |
| 3GPP-IMEISV | 20 | 3GPP TS 29.061 [5] (NOTE 3) | OctetString | V | P | | M | Y | |

TABLE 12.4-1-continued

N6 re-used Diameter AVPs

| Attribute Name | AVP Code | Section defined | Value Type (NOTE 2) | AVP Flag rules (NOTE 1) | | | | May Encr. | Applicability |
| --- | --- | --- | --- | --- | --- | --- | --- | --- | --- |
| | | | | Must | May | Should not | Must not | | |
| 3GPP-RAT-Type | 21 | 3GPP TS 29.061 [5] (NOTE 3) | OctetString | V | P | | M | Y | |
| 3GPP-User-Location-Info | 22 | 3GPP TS 29.061 [5] (NOTE 3) | OctetString | V | P | | M | Y | |
| 3GPP-MS-TimeZone | 23 | 3GPP TS 29.061 [5] (NOTE 3) | OctetString | V | P | | M | Y | |
| 3GPP-Packet-Filter | 25 | 3GPP TS 29.061 [5] (NOTE 3) | OctetString | V | P | | M | Y | |
| 3GPP-Negotiated-DSCP | 26 | 3GPP TS 29.061 [5] (NOTE 3) | OctetString | V | P | | M | Y | |
| 3GPP-Allocate-IP-Type | 27 | 3GPP TS 29.061 [5] (NOTE 3) | OctetString | V | P | | M | Y | |
| External-Identifier | 28 | 3GPP TS 29.061 [5] (NOTE 3) | OctetString | V | P | | M | Y | |
| 3GPP-User-Location-Info-Time | 30 | 3GPP TS 29.061 [5] (NOTE 3) | OctetString | V | P | | M | Y | |
| 3GPP-Notification | 110 | 11.3.1 | OctetString | V | P | | M | Y | |
| 3GPP-UE-MAC-Address | 111 | 11.3.1 | OctetString | V | P | | M | Y | |
| 3GPP-Authorization-Reference | 112 | 11.3.1 | OctetString | V | P | | M | Y | |
| 3GPP-Policy-Reference | 113 | 11.3.1 | OctetString | V | P | | M | Y | |
| 3GPP-Session-AMBR | 114 | 11.3.1 | OctetString | V | P | | M | Y | |
| 3GPP-NAI | 115 | 11.3.1 | OctetString | V | P | | M | Y | |
| 3GPP-Session-AMBR-v2 | 116 | 11.3.1 | OctetString | V | P | | M | Y | eSessionABMR |
| 3GPP-IP-Address-Pool-Info | 118 | 11.3.1 | OctetString | V | P | | M | Y | IpAddrPool |
| Supported-Features | 628 | 3GPP TS 29.229 [41] | Grouped | V | M | | | N | |

(NOTE 1):
The AVP header bit denoted as 'M', indicates whether support of the AVP is required. The AVP header bit denoted as 'V', indicates whether the optional Vendor-ID field is present in the AVP header. For further details, see IETF RFC 6733 [24].
(NOTE 2):
The value types are defined in IETF RFC 6733 [24].
(NOTE 3):
The use of Radius VSA as a Diameter vendor AVP is described in Diameter NASREQ (IETF RFC 7155 [23]) and the P flag may be set.
(NOTE 1):
Attribute 3GPP-CAMEL-Charging-Info (24), TWAN-Identifier (29) and 3GPP-Secondary-RAT-Usage (31) are not applicable for 5G in the present specification.
(NOTE 2):
Table 11.3-2 lists the differences between the RADIUS VSAs used in 5G and the VSAs defined in subclause 16.4.7 of 3GPP TS 29.061 [5].

*Next Change*

12.6.1 General

This clause describes the N6 Diameter messages.
The relevant AVPs that are of use for the N6 interface are detailed in this subclause.
Other Diameter AVPs as defined in IETF RFC 4072 [25] and IETF RFC 7155 [23], even if their AVP flag rules are marked with "M", are not required for being compliant with the current specification.
Diameter messages as defined in subclause 16.4 of 3GPP TS 29.061 [5] are re-used in 5G with the following differences:
  SMF replaces GGSN/P-GW.
  5G QoS flow replaces IP-CAN/EPS bearer and PDU session replaces IP-CAN session.
  N6 replaces Gi/Sgi.
  NOTE: N6 re-used and specific AVPs are specified in subclause 12.3 and subclause 12.4.
  3GPP-NAI AVP may be included in the AAR and ACR command.
  Multiple 3GPP-IP-Address-Pool-Infold AVPs may be included in the AAR command and one or two 3GPP-IP-Address-Pool-Info AVPs may be included in the AAA and ACR command.
  Multiple 3GPP-UE-MAC-Address AVPs may be included in the AAR and ACR command.
  Acct-Application-Id AVP shall be included in the ACR and ACA command as specified in IETF RFC 7155 [23].
  Additional Diameter messages needed for 5G compared to the 3GPP TS 29.061 [5] are described in the following subclauses.
  Multiple Supported-Features AVPs may be included in the ACR and ACA command.

*Next Change*

12.6.2 DER Command

The DER command, defined in IETF RFC 4072 [25], is indicated by the Command-Code field set to 268 and the 'R' bit set in the Command Flags field. It is sent by the SMF to the DN-AAA server upon reception of an initial access request (e.g. Nsmf_PDUSession_CreateSMContext) message for a given DNN to request user authentication and authorization.
The relevant AVPs that are of use for the N6 interface are detailed in the ABNF description below. Other valid AVPs for this command are not used for N6 purposes and should be ignored by the receiver or processed according to the relevant specifications. The bold marked AVPs in the message format indicate new optional AVPs for N6, or modified existing AVPs.
Message Format:

```
<Diameter-EAP-Request> ::= < Diameter Header: 268, REQ, PXY >
                           < Session-Id >
                           { Auth-Application-Id }
                           { Origin-Host }
                           { Origin-Realm }
                           { Destination-Realm }
                           { Auth-Request-Type }
                           [ Destination-Host ]
                           [ NAS-Port ]
                           [ NAS-Port-Id ]
                           [ NAS-Port-Type ]
```

-continued

```
                           [ Origin-State-Id ]
                           [ Port-Limit ]
                           [ User-Name ]
                           { EAP-Payload }
                           [ EAP-Key-Name ]
                           [ Service-Type ]
                           [ Authorization-Lifetime ]
                           [ Auth-Grace-Period ]
                           [ Auth-Session-State ]
                           [ Callback-Number ]
                           [ Called-Station-Id ]
                           [ Calling-Station-Id ]
                           [ Originating-Line-Info ]
                           [ Connect-Info ]
                         * [ Framed-Compression ]
                           [ Framed-Interface-Id ]
                           [ Framed-IP-Address ]
                         * [ Framed-Ipv6-Prefix ]
                         * [ Delegated-Ipv6-Prefix ]
                           [ Framed-IP-Netmask ]
                           [ Framed-MTU ]
                           [ Framed-Protocol ]
                         * [ Tunneling ]
                         * [ Proxy-Info ]
                         * [ Route-Record ]
                           [ External-Identifier ]
                           [ 3GPP-IMSI ]
                           [ 3GPP-NAI ]
                         * [ 3GPP-UE-MAC-Address ]
                           [ 3GPP-Charging-ID ]
                           [ 3GPP-PDP-Type ]
                           [ 3GPP-CG-Address ]
                           [ 3GPP-GPRS-Negotiated-QoS-Profile ]
                           [ 3GPP-SGSN-Address ]
                           [ 3GPP-GGSN-Address ]
                           [ 3GPP-IMSI-MCC-MNC ]
                           [ 3GPP-GGSN-MCC-MNC ]
                           [ 3GPP-NSAPI ]
                           [ 3GPP-Selection-Mode ]
                           [ 3GPP-Charging-Characteristics ]
                           [ 3GPP-CG-Ipv6-Address ]
                           [ 3GPP-SGSN-Ipv6-Address ]
                           [ 3GPP-GGSN-Ipv6-Address ]
                           [ 3GPP-SGSN-MCC-MNC ]
                           [ 3GPP-User-Location-Info ]
                           [ 3GPP-RAT-Type ]
                           [ 3GPP-Negotiated-DSCP ]
                           [ 3GPP-Allocate-IP-Type ]
                           [ TWAN-Identifier ]
                         * [ 3GPP-IP-Address-Pool-Info]
                         * [ Supported-Features ]
                         * [ AVP ]
```

*Next Change*

12.6.3 DEA Command

The DEA command, defined in IETF RFC 4072 [25], is indicated by the Command-Code field set to 268 and the 'R' bit cleared in the Command Flags field. It is sent by the DN-AAA server to the SMF in response to the DER command.
The relevant AVPs that are of use for the N6 interface are detailed in the ABNF description below. Other valid AVPs for this command are not used for N6 purposes and should be ignored by the receiver or processed according to the relevant specifications. The bold marked AVPs in the message format indicate new optional AVPs for N6, or modified existing AVPs.

Message Format:

```
<Diameter-EAP-Answer> ::= < Diameter Header: 268, PXY >
                < Session-Id >
                { Auth-Application-Id }
                { Auth-Request-Type }
                { Result-Code }
                { Origin-Host }
                { Origin-Realm }
                [ User-Name ]
                [ EAP-Payload ]
                [ EAP-Reissued-Payload ]
                [ EAP-Master-Session-Key ]
                [ EAP-Key-Name ]
                [ Multi-Round-Time-Out ]
                [ Accounting-EAP-Auth-Method ]
                [ Service-Type ]
            *   [ Class ]
                [ Acct-Interim-Interval ]
                [ Error-Message ]
                [ Error-Reporting-Host ]
                [ Failed-AVP ]
                [ Idle-Timeout ]
                [ Authorization-Lifetime ]
                [ Auth-Grace-Period ]
                [ Auth-Session-State ]
                [ Re-Auth-Request-Type ]
                [ Session-Timeout ]
            *   [ Reply-Message ]
                [ Origin-State-Id ]
            *   [ Filter-Id ]
                [ Port-Limit ]
                [ Callback-Id ]
                [ Callback-Number ]
            *   [ Framed-Compression ]
                [ Framed-Interface-Id ]
                [ Framed-IP-Address ]
            *   [ Framed-Ipv6-Prefix ]
                [ Framed-Ipv6-Pool ]
            *   [ Framed-Ipv6-Route ]
            *   [ Delegated-Ipv6-Prefix ]
                [ Framed-IP-Netmask ]
            *   [ Framed-Route ]
                [ Framed-Pool ]
                [ Framed-IPX-Network ]
                [ Framed-MTU ]
                [ Framed-Protocol ]
                [ Framed-Routing ]
            *   [ NAS-Filter-Rule ]
            *   [ QoS-Filter-Rule ]
            *   [ Tunneling ]
            *   [ Redirect-Host ]
                [ Redirect-Host-Usage ]
                [ Redirect-Max-Cache-Time ]
            *   [ Proxy-Info ]
            *   [ External-Identifier ]
                [ 3GPP-Ipv6-DNS-Servers ]
                [ 3GPP-Notification ]
       0*16     [ 3GPP-UE-MAC-Address ]
                [ 3GPP-Authorization-Reference ]
                [ 3GPP-Policy-Reference ]
                [ 3GPP-Session-AMBR ]
                [ 3GPP-Session-AMBR-v2 ]
       0*2      [ 3GPP-IP-Address-Pool-Info]
            *   [ Supported-Features ]
            *   [ AVP ]
```

*End of Changes*

Please note that the terms "indicator" and "attribute" may be interchangeably used herein.

Next, some specific embodiments of the present disclosure in which the above attribute is used will be explained with reference to FIG. 3 and FIG. 4 in conjunction with FIG. 2.

Figure 3:
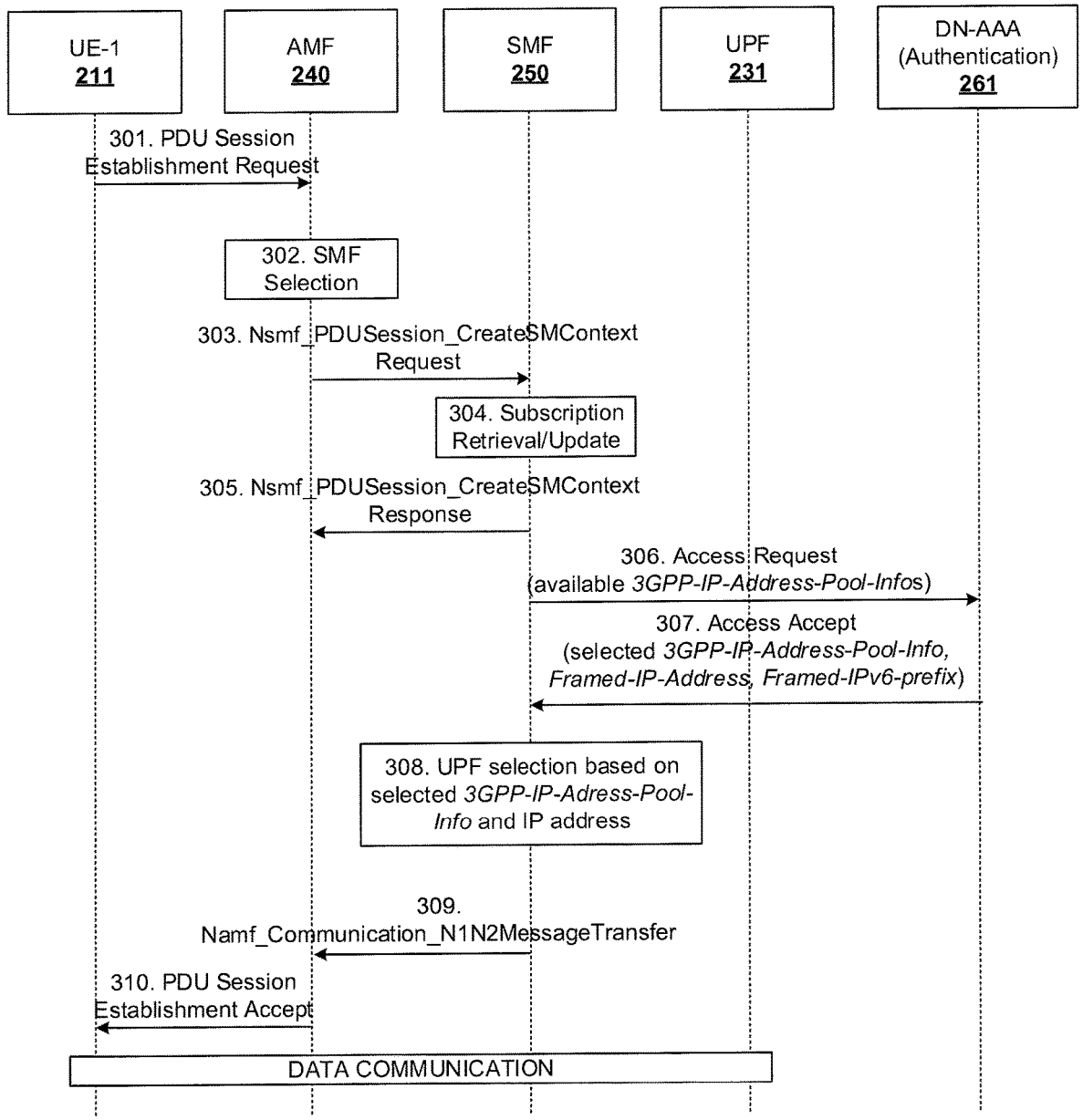
FIG. 3 is a message flow diagram illustrating exemplary messages exchanged between different nodes for facilitating reuse of an IP address according to an embodiment of the present disclosure.

FIG. 3 is a message flow diagram illustrating exemplary messages exchanged between different nodes (e.g. the nodes shown in FIG. 2) for facilitating reuse of an IP address according to an embodiment of the present disclosure. To be specific, FIG. 3 shows a UE-initiated PDU session establishment procedure in a non-roaming scenario. However, it is merely an example to illustrate the principle of the present disclosure and therefore the present disclosure is not limited thereto.

As shown in FIG. 3, a UE (e.g. the UE 211 shown in FIG. 2) tries to establish a new PDU session within the operator domain (e.g., the operator domain 200 shown in FIG. 2), and the description of the steps of the procedure is given below.

Step S301. A PDU Session Establishment Request is transmitted from the UE-1 211 to the AMF 240, in which a new PDU session ID may be generated and included by the UE-1 211. The UE-1 211 may initiate the UE Requested PDU Session Establishment procedure by the transmission of a NAS message containing a PDU Session Establishment Request within the N1 SM container.

Step S302. The AMF 240 may select an SMF (e.g. the SMF 250) for the UE-1 211's PDU Session Establishment Request, for example, based on the parameters comprised in the message and/or configurations/policies stored locally or externally (e.g. at UDM or PCF).

Step S303. An Nsmf_PDUSession_CreateSMContext Request message is transmitted from the AMF 240 to the selected SMF 250 to request the SMF 250 to be associated for the PDU session to be created.

Step S304. The SMF 250 may retrieve or update the Session Management Subscription data from UDM, which is not shown in FIG. 3.

Step S305. An Nsmf_PDUSession_CreateSMContext Response message may be transmitted from the SMF 250 to the AMF 240 in response to the request message in step S303. If the SMF 250 received the Nsmf_PDUSession_CreateSMContext Request in step S303 and the SMF 250 is able to process the PDU Session establishment request, the SMF 250 may create an SM context and responds to the AMF 240 by providing an SM Context ID. On the other hand, when the SMF 250 decides to not accept to establish a PDU Session, the SMF 250 may reject the UE request via NAS SM signalling including a relevant SM rejection cause by responding to the AMF 240 with Nsmf_PDUSession_CreateSMContext Response. The SMF 250 may also indicate to the AMF 240 that the PDU Session ID is to be considered as released, and the PDU Session Establishment procedure may be stopped.

Step S306. The SMF 250 decides that a secondary authentication/authorization is to be performed, and therefore an Access Request message may be transmitted from the SMF 250 to the DN-AAA/Authentication 261. As mentioned earlier, one or more 3GPP-IP-Address-Pool-Infos attributes indicating one or more available IP address pools may be included in the Access Request message such that the DN-AAA/Authentication 261 is enabled to select one of them and allocate, to the UE-1 211, an IP address from the selected IP address pool.

Step S307. An Access-Accept message may be transmitted from the DN-AAA/Authentication 261 to the SMF 250 to indicate its selection of the IP address pool (or its corresponding UPF 231), for example, by the selected 3GPP-IP-Address-Pool-Info attribute. Further, some optional steps may be performed, for example, PCF selection/SM policy association establishment or modification. Since these steps are not directly related to the embodiments of the present disclosure, the description thereof is omitted for simplicity.

Step S308. The SMF 250 may select a UPF (e.g. the UPF 231) as the anchor of this PDU Session based on the received 3GPP-IP-Address-Pool-Info attribute included in the Access Accept message. Further, if Request Type indicates "initial request", the SMF 250 may initiate an N4 Session Establishment procedure with the selected UPF 231, otherwise it initiates an N4 Session Modification procedure with the selected UPF 231.

Step S309. An Namf_Communication_N1N2MessageTransfer message may be transmitted from the SMF 250 to the AMF 240 to inform the AMF 240 of various parameters, such as the allocated IP address (an IPv4 address, a IPv6 prefix, or both), QoS parameters, etc.

Step S310. An N2 PDU Session Request may be transmitted from the AMF 240 to (R)AN, which is not shown in FIG. 3 and in turn issues AN specific signalling exchange with the UE-1 211 that is related with the information received from the SMF 250. In other words, the AMF 240 may indicate "PDU Session Establishment Accept" to the UE-1 211 via signalling specific to the gNB-1 221.

After that, a PDU session is successfully established for the UE-1 211, and UE-1 211 may communicate its uplink/downlink data with the Internet 295 via the firewall/NAT at the selected UPF 231, as shown in FIG. 2.

Figure 4:
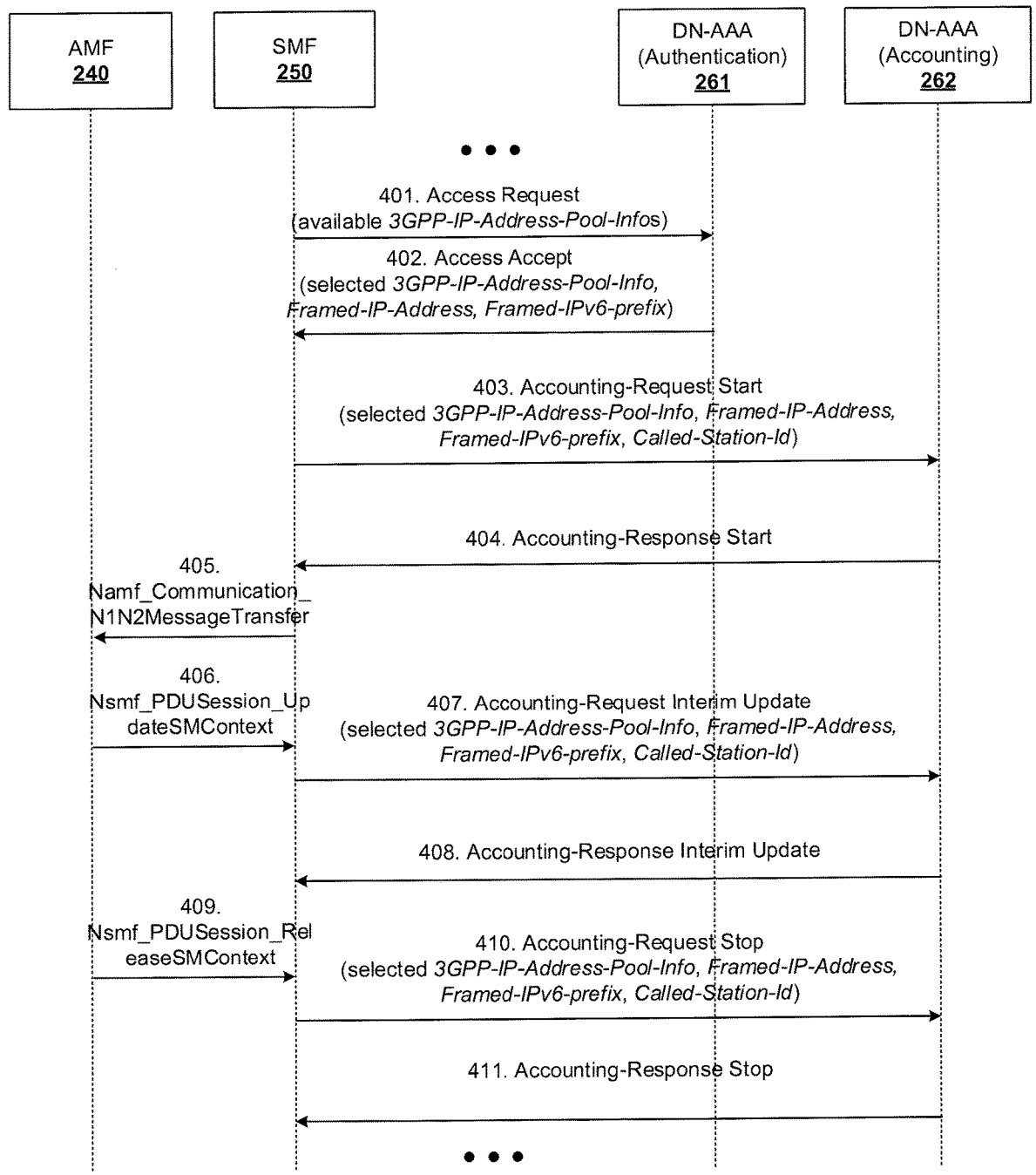
FIG. 4 is another message flow diagram illustrating exemplary messages exchanged between different nodes for facilitating reuse of an IP address according to another embodiment of the present disclosure.

FIG. 4 is another message flow diagram illustrating exemplary messages exchanged between different nodes (e.g. the nodes shown in FIG. 2) for facilitating reuse of an IP address according to another embodiment of the present disclosure. For the purpose of simplicity, description of some steps in FIG. 4 which are same or similar to those shown in FIG. 3 is omitted. For example, the steps before step S401 and after step S411 are omitted for simplicity. Further, the step S401 and step S402 in FIG. 4 may be similar to the step S306 and step S307, respectively, and the detailed description thereof is omitted.

At steps S401 and S402, the SMF 250 successfully obtains information necessary for the subsequent steps from the DN-AAA/Authentication 261, such as, the selected 3GPP-IP-Address-Pool-Info and the allocated IPv4 address/IPv6 prefix, as shown in FIG. 4.

After that, at step S403, the SMF 250 may transmit an Accounting-Request Start message (or to be specific, an Accounting-Request message with the attribute "Acct-Status-Type" set to be 1) to the DN-AAA/Accounting 262 to start accounting service for the PDU session (e.g. the PDU session established for the UE-1 211). The Accounting-Request Start message may comprise the information obtained at the step S402, such as, the selected 3GPP-IP-Address-Pool-Info and the allocated IPv4 address/IPv6 prefix. In some embodiments, the message may further comprise information or attribute for identifying the target network, such as, "Called-Station-Id", which indicates the target network to be accessed, i.e. APN/DNN.

At step S404, upon receipt of the Accounting-Request Start message comprising the selected 3GPP-IP-Address-Pool-Info and the allocated IPv4 address/IPv6 prefix, the DN-AAA/Accounting 262 may now correctly identify the PDU session or the UE, even if a same IPv4 address/IPv6 prefix and a same APN/DNN are used by different PDU sessions or UEs. Therefore, the DN-AAA/Accounting 262 may respond to the SMF 250 with an Accounting-Response Start message (or to be specific, an Accounting-Response message with the attribute "Acct-Status-Type" set to be 1) to indicate that the accounting service for the PDU session is started.

Later, the AMF 240 and the SMF 250 may exchange messages at steps S405 and S406, such as Namf_Communication_N1N2MessageTransfer or Nsmf_PDUSession_UpdateSMContext, and therefore the AMF 240 is notified of a successful establishment of the PDU session, and later an update of the accounting service for the PDU session may be triggered.

In such a case, at step S407, the SMF 250 may transmit an Accounting-Request Interim Update message (or to be specific, an Accounting-Request message with the attribute "Acct-Status-Type" set to be 3) to the DN-AAA/Accounting 262 to update accounting service for the PDU session. Similarly, the Accounting-Request Interim Update message may also comprise the information obtained at the step S402, such as, the selected 3GPP-IP-Address-Pool-Info and the allocated IPv4 address/IPv6 prefix. In some embodiments, the message may further comprise information or attribute for identifying the target network, such as, "Called-Station-Id".

At step S408, upon receipt of the Accounting-Request Interim Update message comprising the selected 3GPP-IP-Address-Pool-Info and the allocated IPv4 address/IPv6 prefix, the DN-AAA/Accounting 262 may now correctly identify the PDU session or the UE, even if a same IPv4 address/IPv6 prefix and a same APN/DNN are used by different PDU sessions or UEs. Therefore, the DN-AAA/Accounting 262 may respond to the SMF 250 with an Accounting-Response Interim Update message (or to be specific, an Accounting-Response message with the attribute "Acct-Status-Type" set to be 3) to indicate that the accounting service for the PDU session is updated.

Later, the AMF 240 may transmit a message to the SMF 250 at steps S409, such as Nsmf_PDUSession_ReleaseSMContext, and therefore a release of the accounting service for the PDU session is triggered.

In such a case, at step S410, the SMF 250 may transmit an Accounting-Request Stop message (or to be specific, an Accounting-Request message with the attribute "Acct-Status-Type" set to be 2) to the DN-AAA/Accounting 262 to stop the accounting service for the PDU session. Similarly, the Accounting-Request Stop message may also comprise the information obtained at the step S402, such as, the selected 3GPP-IP-Address-Pool-Info and the allocated IPv4 address/IPv6 prefix. In some embodiments, the message may further comprise information or attribute for identifying the target network, such as, "Called-Station-Id".

At step S411, upon receipt of the Accounting-Request Stop message comprising the selected 3GPP-IP-Address-Pool-Info and the allocated IPv4 address/IPv6 prefix, the DN-AAA/Accounting 262 may now correctly identify the PDU session or the UE, even if a same IPv4 address/IPv6 prefix and a same APN/DNN are used by different PDU sessions or UEs. Therefore, the DN-AAA/Accounting 262 may respond to the SMF 250 with an Accounting-Response Stop message (or to be specific, an Accounting-Response message with the attribute "Acct-Status-Type" set to be 2) to indicate that the accounting service for the PDU session is stopped.

After that, the PDU session for the UE-1 211 may be terminated and resources allocated to this PDU session may be released.

Therefore, from the above description with reference to FIG. 3 and FIG. 4, it is clear that the DN-AAA/Accounting server 262, which was previously not aware of the reuse of the same IP address and APN/DNN at multiple UEs, may benefit from the use of attribute "3GPP-IP-Address-Pool-Id", "3GPP-IP-Address-Pool-Info", or another customized RADIUS attribute in the Accounting-Request Start/Interim Update/Stop messages. Further, the SMF 250 may now know the selection of the UPF by the DN-AAA/Authentication 261 with "3GPP-IP-Address-Pool-Id", "3GPP-IP-Address-Pool-Info", or another customized RADIUS attribute in the Access Accept message, which may be later used for accounting service related operations. Furthermore, when a dual IP stack (i.e. IPv4v6) is needed, the additional field "IP version" in the attribute "3GPP-IP-Address-Pool-Info" may help the DN-AAA/Authentication 261 in identifying the correct IP address pool from which an IP address is allocated to the PDU session.

Figure 5:
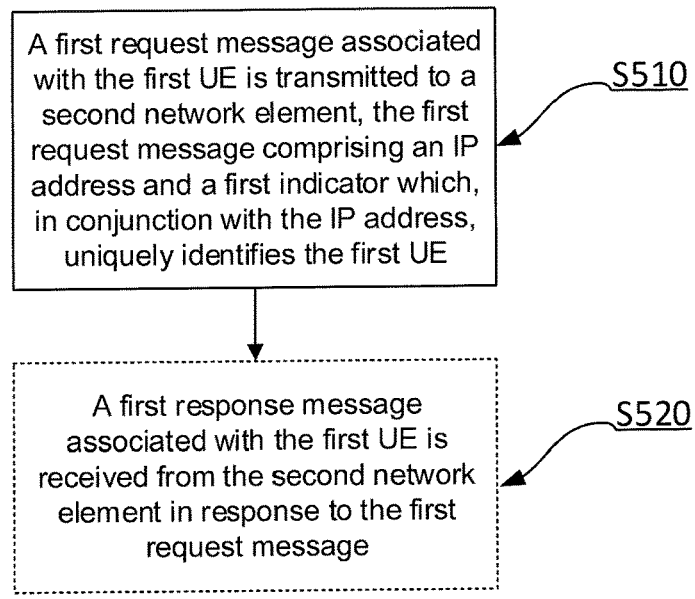
FIG. 5 is a flow chart illustrating an exemplary method at a first network element for facilitating reuse of an IP address according to an embodiment of the present disclosure.

FIG. 5 is a flow chart of an exemplary method 500 for facilitating reuse of an IP address at multiple User Equipments (UEs) (e.g. the UE-1 211, UE-2 212, UE-3 213, UE-4 214) according to an embodiment of the present disclosure. The method 500 may be performed at a first network element (e.g. the SMF 250 shown in FIG. 2 or the network element 800 shown in FIG. 8) for reuse of IP addresses. The method 500 may comprise step S510 and an optional Step S520. However, the present disclosure is not limited thereto. In some other embodiments, the method 500 may comprise more steps, less steps, different steps or any combination thereof. Further the steps of the method 500 may be performed in a different order than that described herein. Further, in some embodiments, a step in the method 500 may be split into multiple sub-steps and performed by different entities, and/or multiple steps in the method 500 may be combined into a single step.

The method 500 may begin at step S510 where a first request message associated with the first UE may be transmitted to a second network element. In some embodiments, the first request message may comprise the IP address and a first indicator which, in conjunction with the IP address, uniquely identifies the first UE.

In some embodiments, the method 500 may further comprise a step S520 where a first response message associated with the first UE may be received from the second network element in response to the first request message. In some embodiments, the second network element may be a part of an Authentication, Authorization and Accounting (AAA) server for accounting. In some embodiments, the first request message may be one of: an Accounting-Request START message, an Accounting-Request STOP message, and an Accounting-Request Interim-Update message, and the first response message is a corresponding one of: an Accounting-Response START message, an Accounting-Response STOP message, and an Accounting-Response Interim-Update message.

In some embodiments, before the step S510, the method 500 may further comprise steps of: transmitting, to a third network element, a second request message associated with the first UE, the second request message comprising one or more second indicators, each of which indicates an IP address pool from which one or more IP addresses are available to be allocated to the first UE; and receiving, from the third network element, a second response message in response to the second request message, the second response message comprising a third indicator which identifies an IP address pool of the one or more IP addresses pools indicated by the one or more second indicators, wherein the IP address from the identified IP address pool is allocated to the first UE.

In some embodiments, the method may further comprise: selecting a User Plane Function (UPF) for the first UE based at least partially on the third indicator. In some embodiments, the third network element may be a part of an AAA server for authentication. In some embodiments, the second request message may be an Access Request message or a Diameter-Extensible Authentication Protocol (EAP)-Request (DER) message, and the second response message may be a corresponding one of an Access Accept message or a Diameter-EAP-Answer (DEA) message. In some embodiments, each of the first indicator, one or more second indicators, and the third indicator may comprise a first field uniquely identifying an IP address pool from which the IP address is allocated to the first UE. In some embodiments, each of the first indicator, the one or more second indicators, and the third indicator may further comprise a second field indicating an IP version applicable for the IP address pool identified by the first field. In some embodiments, the second field may indicate one of IPv4, IPv6, or both. In some embodiments, each of the first indicator, the one or more second indicators, and the third indicator further comprises a third field indicating the length of the first field. In some embodiments, each of the first indicator, the one or more second indicators, and the third indicator may be a 3GPP-IP-Address-Pool-Id attribute, a 3GPP-IP-Address-Pool-Info attribute, or a customized Remote Authentication Dial In User Service (RADIUS) attribute. In some embodiments, the first request message may further comprise a fourth indicator identifying a network to be accessed by the first UE.

In some embodiments, the fourth indicator may be a Called-Station-Id attribute or a customized RADIUS attribute. In some embodiments, the IP address may comprise an IPv4 address, an IPv6 prefix, or both. In some embodiments, the first network element may be a Session Management Function (SMF) or a Packet Data Network (PDN) Gateway for Control Plane (PGW-C).

Figure 6:
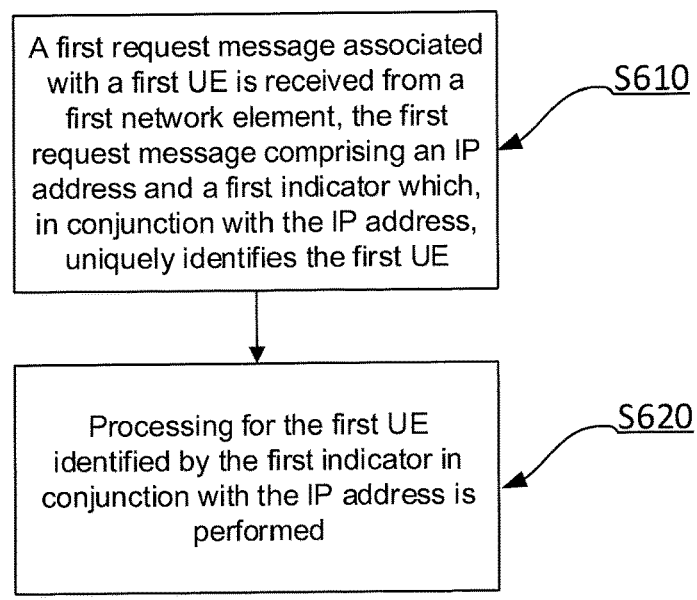
FIG. 6 is a flow chart illustrating an exemplary method at a second network element for facilitating reuse of an IP address according to an embodiment of the present disclosure.

FIG. 6 is a flow chart of an exemplary method 600 for facilitating reuse of an IP address at multiple User Equipments (UEs) (e.g. the UE-1 211, UE-2 212, UE-3 213, UE-4 214) according to an embodiment of the present disclosure. The method 600 may be performed at a second network element (e.g. the DN-AAA/Accounting 262 shown in FIG. 2 or the network element 800 shown in FIG. 8) for reuse of IP addresses. The method 600 may comprise step S610 and step S620. However, the present disclosure is not limited thereto. In some other embodiments, the method 600 may comprise more steps, less steps, different steps or any combination thereof. Further the steps of the method 600 may be performed in a different order than that described herein. Further, in some embodiments, a step in the method 600 may be split into multiple sub-steps and performed by different entities, and/or multiple steps in the method 600 may be combined into a single step.

The method 600 may begin at step S610 where a first request message associated with the first UE may be received from a first network element. In some embodiments, the first request message may comprise the IP address and a first indicator which, in conjunction with the IP address, uniquely identifies the first UE.

At step S620, processing for the first UE identified by the first indicator in conjunction with the IP address may be performed.

In some embodiments, the method 600 may further comprise a step of transmitting, to the first network element, a first response message associated with the first UE based on a result of the processing. In some embodiments, the second network element may be a part of an Authentication, Authorization and Accounting (AAA) server for accounting. In some embodiments, the first request message may be one of: an Accounting-Request START message, an Accounting- Request STOP message, and an Accounting-Request Interim-Update message, and the first response message may be a corresponding one of: an Accounting-Response START message, an Accounting-Response STOP message, and an Accounting-Response Interim-Update message. In some embodiments, the first indicator may comprise a first field uniquely identifying an IP address pool from which the IP address is allocated to the first UE. In some embodiments, the first indicator may further comprise a second field indicating an IP version applicable for the IP address pool identified by the first field. In some embodiments, the second field may indicate one of IPv4, IPv6, or both. In some embodiments, the first indicator further comprises a third field indicating the length of the first field. In some embodiments, the first indicator may be a 3GPP-IP-Address-Pool-Id attribute, a 3GPP-IP-Address-Pool-Info attribute, or a customized Remote Authentication Dial In User Service attribute. In some embodiments, the first request message may further comprise a fourth indicator identifying a network to be accessed by the first UE. In some embodiments, the fourth indicator may be a Called-Station-Id attribute or a customized RADIUS attribute. In some embodiments, the IP address may comprise an IPv4 address, an IPv6 prefix, or both. In some embodiments, the first network element may be a Session Management Function (SMF) or a Packet Data Network (PDN) Gateway for Control Plane (PGW-C).

Figure 7:
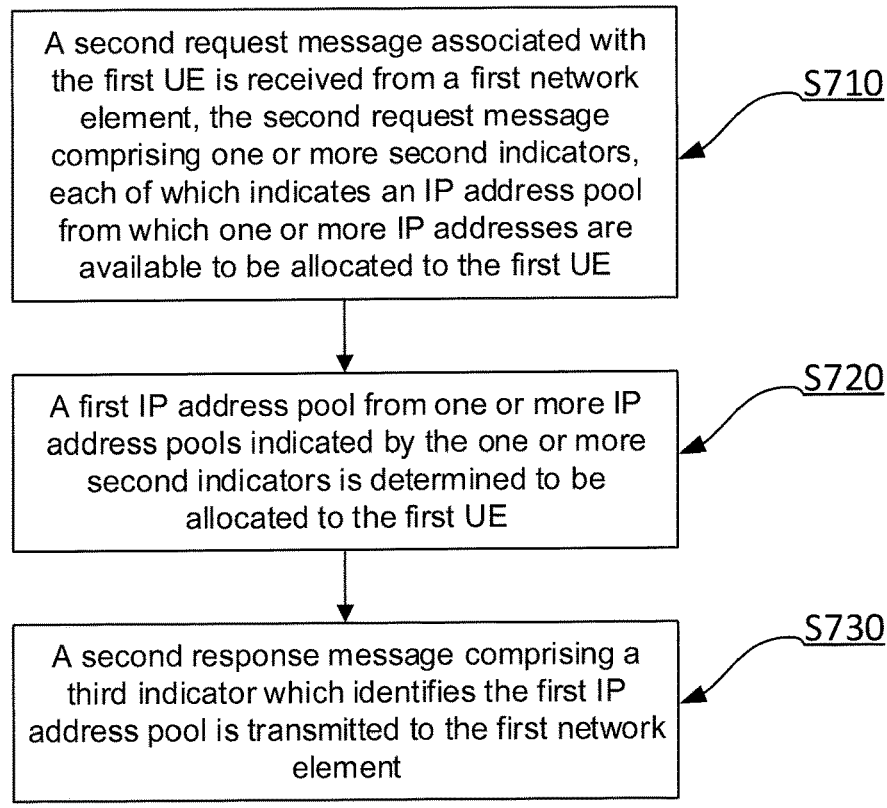
FIG. 7 is a flow chart illustrating an exemplary method at a third network element for facilitating reuse of an IP address according to an embodiment of the present disclosure.

FIG. 7 is a flow chart of an exemplary method 700 for facilitating reuse of an IP address at multiple User Equipments (UEs) (e.g. the UE-1 211, UE-2 212, UE-3 213, UE-4 214) according to an embodiment of the present disclosure. The method 700 may be performed at a third network element (e.g. the DN-AAA/Authentication 261 shown in FIG. 2 or the network element 800 shown in FIG. 8) for reuse of IP addresses. The method 700 may comprise step S710, step S720, and step S730. However, the present disclosure is not limited thereto. In some other embodiments, the method 700 may comprise more steps, less steps, different steps or any combination thereof. Further the steps of the method 700 may be performed in a different order than that described herein. Further, in some embodiments, a step in the method 700 may be split into multiple sub-steps and performed by different entities, and/or multiple steps in the method 700 may be combined into a single step.

The method 700 may begin at step S710 where a second request message associated with the first UE is received from a first network element. In some embodiments, the second request message may comprise one or more second indicators, each of which indicates an IP address pool from which one or more IP addresses are available to be allocated to the first UE.

At step S720, a first IP address pool is determined, from one or more IP address pools indicated by the one or more second indicators, to be allocated to the first UE.

At step S730, a second response message comprising a third indicator which identifies the first IP address pool is transmitted to the first network element.

In some embodiments, the third network element may be a part of an AAA server for authentication. In some embodiments, the second request message may be an Access Request message or a Diameter-Extensible Authentication Protocol (EAP)-Request (DER) message, and the second response message may be a corresponding one of an Access Accept message or a Diameter-EAP-Answer (DEA) message. In some embodiments, each of the one or more second indicators and the third indicator may comprise a first field uniquely identifying the first IP address pool. In some embodiments, each of the one or more second indicators and the third indicator may further comprise a second field indicating an IP version applicable for the IP address pool identified by the first field. In some embodiments, the second field may indicate one of IPv4, IPv6, or both. In some embodiments, each of the one or more second indicators and the third indicator further comprises a third field indicating the length of the first field. In some embodiments, each of the one or more second indicators and the third indicator may be a 3GPP-IP-Address-Pool-Id attribute, a 3GPP-IP-Address-Pool-Info attribute, or a customized Remote Authentication Dial In User Service (RADIUS) attribute. In some embodiments, the IP address may comprise an IPv4 address, an IPv6 prefix, or both. In some embodiments, the first network element may be a Session Management Function (SMF) or a Packet Data Network (PDN) GateWay for Control Plane (PGW-C).

According to present disclosure, a method at a first network element (250) for facilitating reuse of an Internet Protocol (IP) address at multiple User Equipments (UEs) comprising a first UE, is provided. The method may comprise: transmitting to a second network element (262), a request message associated with the first UE, the first request message comprising an indicator which indicates information on IP address pool, wherein the information on IP address pool indicates the IP version of the IP address pool; and receiving, from the third network element (261), a response message in response to the request message, the response message comprising the indicator which indicates information on IP address pool, wherein the information on IP address pool indicates the IP version of the IP address pool. In some embodiments, the request message may be one of: Access request message, accounting request message, DER Command, AAR Command, and ACR Command; the response message may be one of: Access accept message, accounting response message, DEA message, AAA Command, and ACA Command.

Figure 8:
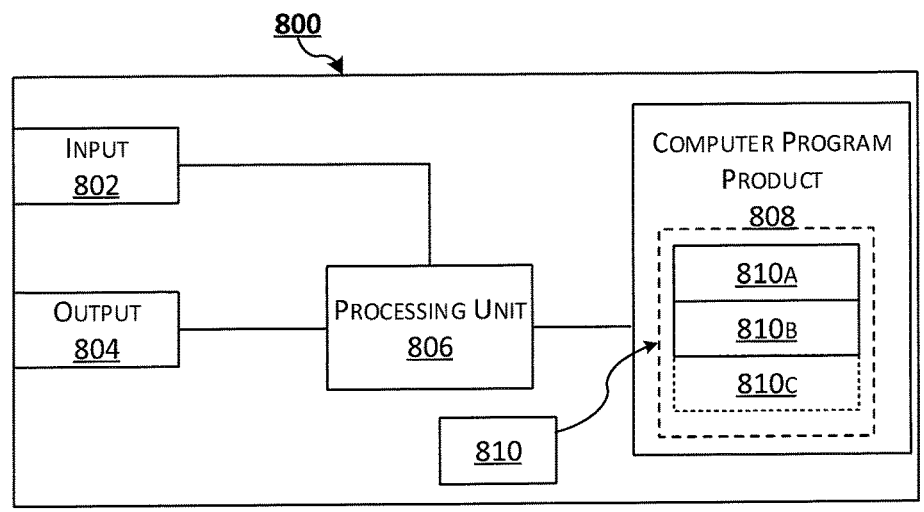
FIG. 8 schematically shows an embodiment of an arrangement which may be used in a network element according to an embodiment of the present disclosure.

FIG. 8 schematically shows an embodiment of an arrangement 800 which may be used in a network element (e.g., the first network element, the second network element, or the third network element) according to an embodiment of the present disclosure. Comprised in the arrangement 800 are a processing unit 806, e.g., with a Digital Signal Processor (DSP) or a Central Processing Unit (CPU). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity or as separate entities.

Furthermore, the arrangement 800 may comprise at least one computer program product 808 in the form of a non-volatile or volatile memory, e.g., an Electrically Erasable Programmable Read-Only Memory (EEPROM), a flash memory and/or a hard drive. The computer program product 808 comprises a computer program 810, which comprises code/computer readable instructions, which when executed by the processing unit 806 in the arrangement 800 causes the arrangement 800 and/or the network elements in which it is comprised to perform the actions, e.g., of the procedure described earlier in conjunction with FIG. 3 to FIG. 7 or any other variant.

The computer program 810 may be configured as a computer program code structured in computer program modules 810A. Hence, in an exemplifying embodiment when the arrangement 800 is used in a first network element, the code in the computer program of the arrangement 800 includes: a transmission module 810A for transmitting, to a second network element, a first request message associated with the first UE, the first request message comprising the IP address and a first indicator which, in conjunction with the IP address, uniquely identifies the first UE.

Further, the computer program 810 may be configured as a computer program code structured in computer program modules 810A and 810B. Hence, in an exemplifying embodiment when the arrangement 800 is used in a second network element, the code in the computer program of the arrangement 800 includes: a reception module 810A for receiving, from a first network element, a first request message associated with the first UE, the first request message comprising the IP address and a first indicator which, in conjunction with the IP address, uniquely identifies the first UE; and a performing module 810B for performing processing for the first UE identified by the first indicator in conjunction with the IP address.

Furthermore, the computer program 810 may be configured as a computer program code structured in computer program modules 810A, 810B, and 810C. Hence, in an exemplifying embodiment when the arrangement 800 is used in a third network element, the code in the computer program of the arrangement 800 includes: a reception module 810A for receiving, from a first network element, a second request message associated with the first UE, the second request message comprising one or more second indicators, each of which indicates an IP address pool from which one or more IP addresses are available to be allocated to the first UE; a determination module 810B for determining a first IP address pool from one or more IP address pools indicated by the one or more second indicators to be allocated to the first UE; and a transmission module 810C for transmitting, to the first network element, a second response message comprising a third indicator which identifies the first IP address pool.

The computer program modules could essentially perform the actions of the flow illustrated in FIG. 3 to FIG. 7, to emulate the network elements. In other words, when the different computer program modules are executed in the processing unit 806, they may correspond to different modules in the various network elements.

Although the code means in the embodiments disclosed above in conjunction with FIG. 8 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method at a Session Management Function, SMF, for facilitating reuse of a private Internet Protocol, IP, address at multiple User Equipments, UEs, comprising a first UE, the method comprising:

transmitting, to a Data Network-Authentication, Authorization & Accounting, DN-AAA, accounting server, a first request message associated with the first UE, the first request message comprising (i) the private IP address comprising at least one of an IPV4 address and an IPV6 prefix, the private IP address not being globally unique and (ii) a selected first 3GPP-IP-Address-Pool-Info which, in conjunction with the private IP address, uniquely identifies a Protocol Data Unit, PDU, session of the first UE, wherein the first 3GPP-IP-Address-Pool-Info indicates information on an IP address pool comprising a plurality of not globally unique private IP addresses; and receiving, from the DN-AAA accounting server, a first response message associated with the first UE in response to the first request message, wherein the first request message is one of: an Accounting-Request START message, an Accounting-Request STOP message, an ACR Command, and an Accounting-Request Interim-Update message, and wherein the first response message is a corresponding one of: an Accounting-Response START message, an Accounting-Response STOP message, an ACA Command, and an Accounting-Response Interim-Update message.

2. The method of claim 1, wherein before the transmission of the first request message, the method further comprises:

transmitting, to a DN-AAA, authentication server, a second request message associated with the first UE, the second request message comprising one or more second 3GPP-IP-Address-Pool-Infos, each of which indicates an IP address pool from which one or more private IP addresses are available to be allocated to the first UE; and receiving, from the DN-AAA authentication server, a second response message in response to the second request message, the second response message comprising a third 3GPP-IP-Address-Pool-Info which identifies an IP address pool of the one or more IP addresses pools indicated by the one or more second 3GPP-IP-Address-Pool-Infos, wherein the private IP address from the identified IP address pool is allocated to the first UE.

3. The method of claim 2, further comprising:

selecting a User Plane Function, UPF, for the first UE based at least partially on the third 3GPP-IP-Address-Pool-Info.

4. The method of claim 1, wherein the second request message is an Access Request message or a Diameter-Extensible Authentication Protocol, EAP, Request, DER, message, and the second response message is a corresponding one of an Access Accept message or a Diameter-EAP-Answer, DEA, message.

5. The method of claim 1, wherein each of the first 3GPP-IP-Address-Pool-Info, the one or more second 3GPP- IP-Address-Pool-Infos, and the third 3GPP-IP-Address-Pool-Info comprises a first field uniquely identifying an IP address pool from which the private IP address is allocated to the first UE.

6. The method of claim 5, wherein each of the first 3GPP-IP-Address-Pool-Info, the one or more second 3GPP-IP-Address-Pool-Infos, and the third 3GPP-IP-Address-Pool-Info further comprises a second field indicating an IP version applicable for the IP address pool identified by the first field.

7. The method of claim 6, wherein the second field indicates one of IPv4, IPv6, or both.

8. The method of claim 5, wherein each of the first 3GPP-IP-Address-Pool-Info, the one or more second 3GPP-IP-Address-Pool-Infos, and the third 3GPP-IP-Address-Pool-Info further comprises a third field indicating the length of the first field.

9. The method of claim 1, wherein the first request message further comprises a fourth indicator identifying a network to be accessed by the first UE.

10. The method of claim 9, wherein the fourth indicator is a Called-Station-Id attribute or a customized RADIUS attribute.

11. A method at a Data Network-Authentication, Authorization & Accounting, DN-AAA, accounting server for facilitating reuse of a private Internet Protocol, IP, address at multiple User Equipments, UEs, comprising a first UE, the method comprising:
receiving, from a Session Management Function, SMF, a first request message associated with the first UE, the first request message comprising (i) the private IP address comprising at least one of an IPV4 address and an IPV6 prefix, the private IP address not being globally unique and (ii) a selected first 3GPP-IP-Address-Pool-Info which, in conjunction with the private IP address, uniquely identifies a Protocol Data Unit, PDU, session of the first UE, wherein the first 3GPP-IP-Address-Pool-Info indicates information on an IP address pool comprising a plurality of not globally unique private IP addresses;
performing processing for the first UE identified by the first 3GPP-IP-Address-Pool-Info in conjunction with the private IP address,
wherein the first request message is one of: an Accounting-Request START message, an Accounting-Request STOP message, and an Accounting-Request Interim-Update message, ACR Command, and wherein the first response message is a corresponding one of: an Accounting-Response START message, an Accounting-Response STOP message, ACA Command, and an Accounting-Response Interim-Update message.

12. The method of claim 11, further comprising:
transmitting, to the SMF, a first response message associated with the first UE based on a result of the processing.

13. The method of claim 11, wherein the first 3GPP-IP-Address-Pool-Info comprises a first field uniquely identifying an IP address pool from which the private IP address is allocated to the first UE.

14. The method of claim 13, wherein the first 3GPP-IP-Address-Pool-Info further comprises a second field indicating an IP version applicable for the IP address pool identified by the first field.

15. The method of claim 14, wherein the second field indicates one of IPv4, IPv6, or both.

16. The method of claim 13, wherein the first 3GPP-IP-Address-Pool-Info further comprises a third field indicating the length of the first field.

17. The method of claim 11, wherein the first request message further comprises a fourth indicator identifying a network to be accessed by the first UE.

18. The method of claim 17, wherein the fourth indicator is a Called-Station-Id attribute or a customized RADIUS attribute.

* * * * *